(12) United States Patent
Wiggins et al.

(10) Patent No.: US 10,023,281 B2
(45) Date of Patent: Jul. 17, 2018

(54) MOVEABLE CUTTERS AND NET PENETRATING SYSTEMS AND METHODS

(71) Applicant: Adaptive Methods, Inc., Rockville, MD (US)

(72) Inventors: James Wiggins, Thurmont, MD (US); Christopher Norkoski, Mountain View, CA (US); Christopher Lin, Vienna, VA (US)

(73) Assignee: Adaptive Methods, Inc., Rockville, MD (US)

( * ) Notice: Subject to any disclaimer, the term of this patent is extended or adjusted under 35 U.S.C. 154(b) by 15 days.

(21) Appl. No.: 15/085,847

(22) Filed: Mar. 30, 2016

(65) Prior Publication Data
US 2016/0207598 A1    Jul. 21, 2016

Related U.S. Application Data

(60) Continuation-in-part of application No. 14/993,744, filed on Jan. 12, 2016, now Pat. No. 9,511,832, which is a continuation of application No. 14/720,057, filed on May 22, 2015, now Pat. No. 9,260,169, which is a continuation of application No. 14/593,718, filed on
(Continued)

(51) Int. Cl.
| | |
|---|---|
| *B63G 8/00* | (2006.01) |
| *B23D 57/00* | (2006.01) |
| *B26D 1/20* | (2006.01) |
| *F42B 12/02* | (2006.01) |
| *F42B 19/00* | (2006.01) |
| *B23D 45/00* | (2006.01) |

(Continued)

(52) U.S. Cl.
CPC .......... *B63G 8/001* (2013.01); *B23D 45/003* (2013.01); *B23D 47/02* (2013.01); *B23D 51/02* (2013.01); *B23D 57/0084* (2013.01); *B26D 1/20* (2013.01); *F42B 12/02* (2013.01); *F42B 19/005* (2013.01); *B63G 2008/002* (2013.01); *Y10T 83/04* (2015.04); *Y10T 83/0481* (2015.04); *Y10T 83/7863* (2015.04); *Y10T 83/869* (2015.04); *Y10T 83/9321* (2015.04); *Y10T 83/9324* (2015.04); *Y10T 83/9399* (2015.04); *Y10T 83/9401* (2015.04); *Y10T 408/03* (2015.01); *Y10T 408/348* (2015.01); *Y10T 408/895* (2015.01); *Y10T 408/953* (2015.01)

(58) Field of Classification Search
USPC ....... 114/363, 316; 83/353, 356.2, 746, 758, 83/563; 144/363
See application file for complete search history.

(56) References Cited

U.S. PATENT DOCUMENTS

| | | |
|---|---|---|
| 893,173 A | 7/1908 | Kunze |
| 1,247,111 A | 11/1917 | Helmberger |

(Continued)

*Primary Examiner* — J. Woodrow Eldred
(74) *Attorney, Agent, or Firm* — Blank Rome LLP

(57) ABSTRACT

The problem of penetrating through nets and other objects is solved by cutting the object using various cutter systems, which include, for example a track and a moving carriage containing a cutter, a stationary carriage with a fixed or rotating arm, and/or abrasive cutters. The object is cut by a severing, slicing, or wearing action caused by a moveable blade or abrasive surface. An underwater vehicle incorporating an embodiment of the cutter system can cut a sufficiently large opening in the object to allow the vehicle to pass through.

63 Claims, 24 Drawing Sheets

Related U.S. Application Data

Jan. 9, 2015, now Pat. No. 9,061,361, which is a division of application No. 14/156,697, filed on Jan. 16, 2014, now Pat. No. 8,961,079, which is a division of application No. 12/497,285, filed on Jul. 2, 2009, now Pat. No. 8,714,889, and a continuation-in-part of application No. 14/528,693, filed on Oct. 30, 2014, now Pat. No. 9,550,553, which is a continuation of application No. 13/403,491, filed on Feb. 23, 2012, now Pat. No. 8,899,167.

(60) Provisional application No. 62/141,493, filed on Apr. 1, 2015, provisional application No. 62/140,125, filed on Mar. 30, 2015, provisional application No. 61/445,847, filed on Feb. 23, 2011.

(51) Int. Cl.
*B23D 47/02* (2006.01)
*B23D 51/02* (2006.01)

(56) References Cited

U.S. PATENT DOCUMENTS

| | | | | |
|---|---|---|---|---|
| 1,278,005 | A | 9/1918 | Peterson | |
| 1,931,772 | A | 10/1933 | Simpson et al. | |
| 2,304,421 | A | 12/1942 | Rogers | |
| 3,496,709 | A | 2/1970 | Egbert | |
| 3,597,908 | A | 8/1971 | Schaefer et al. | |
| 3,701,331 | A | 10/1972 | Harris, Jr. | |
| 3,760,673 | A | 9/1973 | Peterson, Jr. | |
| 3,842,770 | A | 10/1974 | Hedbawny et al. | |
| 3,844,196 | A | 10/1974 | Taylor et al. | |
| 4,016,728 | A | 4/1977 | Mason | |
| 4,262,578 | A | 4/1981 | Bains | |
| 4,281,696 | A * | 8/1981 | Howard | B27B 31/006 144/357 |
| 4,722,667 | A | 2/1988 | Rikhy et al. | |
| 4,726,278 | A | 2/1988 | Forrester | |
| 4,954,108 | A | 9/1990 | Govan | |
| 5,191,819 | A | 3/1993 | Hoshi | |
| 5,419,272 | A | 5/1995 | Backstein et al. | |
| 6,007,279 | A | 12/1999 | Malone, Jr. | |
| 6,279,441 | B1 * | 8/2001 | Streblow | B27B 1/002 144/242.1 |
| 6,401,706 | B1 | 6/2002 | Hernblom et al. | |
| 6,834,433 | B1 | 12/2004 | Dingus | |
| 8,899,167 | B2 | 12/2014 | Wiggins et al. | |
| 2004/0031366 | A1 * | 2/2004 | Huang | B23D 51/02 83/454 |
| 2006/0285934 | A1 | 12/2006 | Keightley | |
| 2007/0036620 | A1 | 2/2007 | Keightley | |
| 2012/0155979 | A1 | 6/2012 | Khangar et al. | |
| 2012/0191121 | A1 | 7/2012 | Chen et al. | |

* cited by examiner

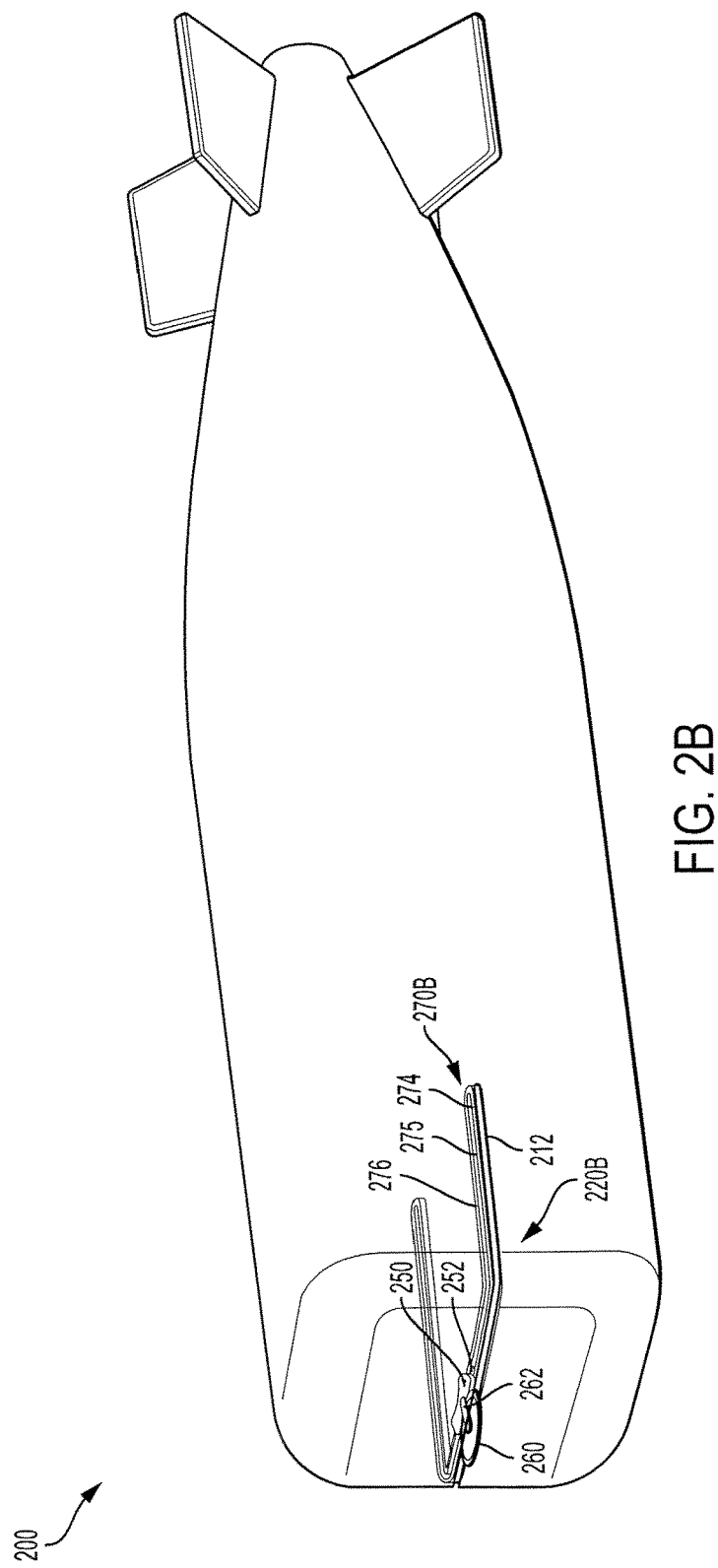

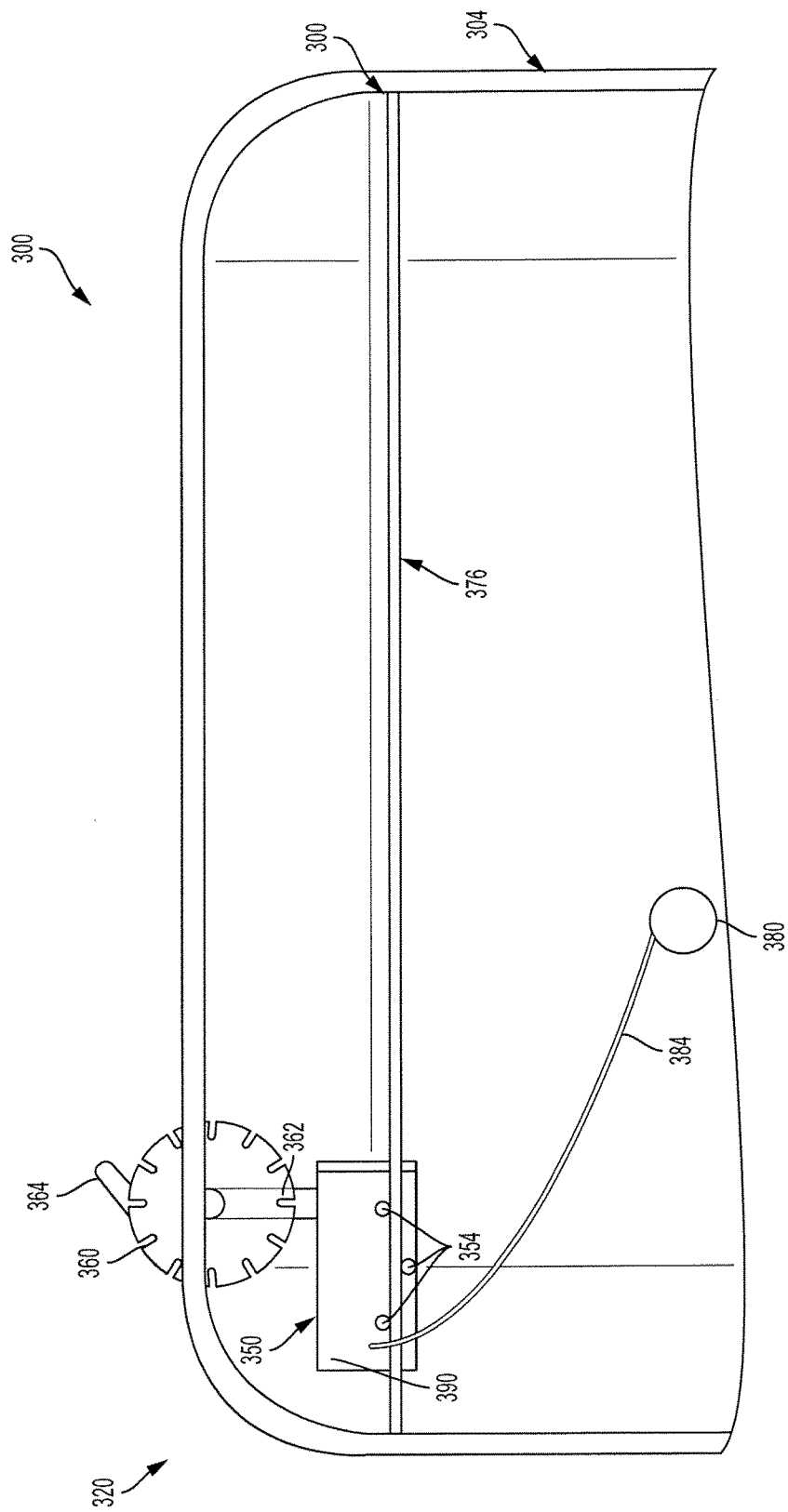

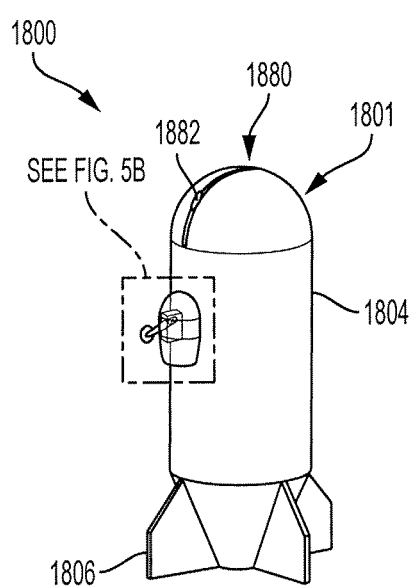
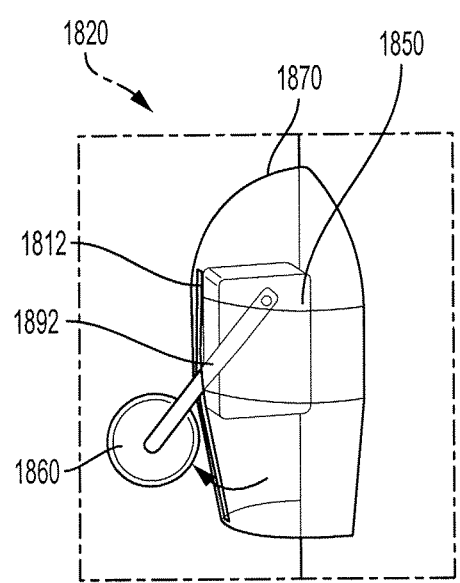
FIG. 18A
FIG. 18B

MOVEABLE CUTTERS AND NET PENETRATING SYSTEMS AND METHODS

This application claims priority under 35 U.S.C. § 119(e) to Provisional Application Nos. 62/140,125, filed on Mar. 30, 2015 and 62/141,493, filed on Apr. 1, 2015, both of which are incorporated herein by reference in their entireties. This application also claims priority as a continuation in part to U.S. application Ser. No. 14/993,744 filed Jan. 12, 2016 entitled "CONCENTRIC CUTTING ASSEMBLY, CONCENTRIC CUTTING SYSTEMS, AND NET PENETRATION METHOD," which is a continuation of Ser. No. 14/720,057 filed May 22, 2015 now U.S. Pat. No. 9,260,169, which is a continuation of Ser. No. 14/593,718 filed Jan. 9, 2015 now U.S. Pat. No. 9,061,361, which is a division of Ser. No. 14/156,697 filed Jan. 16, 2014 now U.S. Pat. No. 8,961,079, which is a division of Ser. No. 12/497,285 filed Jul. 2, 2009 now U.S. Pat. No. 8,714,889 and Ser. No. 14/528,693 filed Oct. 30, 2014 entitled "UNDERWATER VEHICLE CUTTING APPARATUS," which is a continuation of Ser. No. 13/403,491 filed Feb. 23, 2012 now U.S. Pat. No. 8,899,167, which claims priority under 35 U.S.C. § 119(e) to Provisional Application No. 61/445,847 filed Feb. 23, 2011 all of which are incorporated herein by reference in their entireties.

FIELD OF THE INVENTION

The invention relates generally to a cutting assembly, and in particular to a system, method, and apparatus for cutting nets and other objects having wire reinforcement, wire nets, or other hard objects.

BACKGROUND

Nets of various types, materials, sizes and shapes such as, gill nets, purse nets, trawl nets, lift nets, drift nets and aquaculture nets, among others, may cover large areas of the ocean and create physical barriers to moving marine vessels and underwater vehicles. Marine vessels and underwater vehicles can encounter these nets and others in a variety of orientations and tensions. Nets can be anchored and tightly strung, be loose and compliant, or float with weights distributed on the bottom. The use of fishing nets and other objects in water bodies present a significant obstacle to marine vessels and underwater vehicles, especially in littoral zones where fishing activity is concentrated.

Underwater vehicles have expanded our ability to operate in and explore new areas. Further, unmanned underwater vehicles (UUVs) have contributed greatly to the gathering of information in harbors and littoral waters where other underwater vehicles such as submarines cannot travel or may be easily detected. For example, UUVs can carry out critical missions in the areas of intelligence, science, surveillance, reconnaissance, mine countermeasures, tactical oceanography, navigation and anti-submarine warfare. Mission performances, however, have been hindered by a underwater vehicle's inability to penetrate through fishing nets and other objects while traveling underwater. These hindrances are particularly present with UUV's.

Presently, UUV mission areas are scanned for fishing nets and other objects. Mission routes are selected so as to minimize the probability of encountering objects even though the selected route may not be the shortest or the most desired route. Yet, UUVs may be called upon during mission critical situations to penetrate waters in which there is a high probability of encountering fishing nets and other objects. In these situations, a UUV may be forced to stop and maneuver around obstacles encountered during its mission. Even the smallest hull protrusions, such as the control fins, sonar pods and antenna masts of a UUV, may get entangled in a fishing net. Once entangled, divers may be required to retrieve the UUV and cause significant operation delay. Operation failure may result if the UUV is not retrievable or lost altogether.

U.S. Pat. No. 8,961,079 issued Feb. 24, 2015, U.S. Pat. No. 8,899,167 issued Dec. 2, 2014, U.S. Pat. No. 9,061,361 issued Jun. 23, 2015, and U.S. Pat. No. 9,260,169 issued May 22, 2015 and U.S. patent application Ser. No. 14/528,693 filed Oct. 30, 2014, Ser. No. 14/556,986 filed Dec. 1, 2014, and Ser. No. 14/993,744 filed Jan. 12, 2016 are all presently assigned to Adaptive Methods, Inc. located in Rockville, Md. (the "Adaptive Methods patents") describe systems and methods related to net penetrations. Each of those patents and publications are incorporated by reference herein in their entirety.

There is a need and a desire for improved net penetration systems, apparatuses, and methods. Further, more and more nets now contain a wire, or other strengthened material, reinforcement. Accordingly, there is a need and desire for an apparatus, system and method for penetrating through nets and other objects having wire reinforcements or wire nets.

SUMMARY

Disclosed herein are cutting systems and methods for cutting nets or other obstructions. In one example, disclosed herein is a cutting system for an underwater vehicle. In one configuration a cutting system includes a track having a first end and a second end, a first carriage configured to move along the track, and a first cutter connected to the first carriage. In one configuration, a track comprises at least two rails. In another configuration a track includes a toothed rack, a first carriage comprises an advancing motor mechanically linked to a toothed gear, and the toothed gear is configured to interlink with the toothed rack such that rotation of the advancing motor moves the first carriage along the track. In yet another example configuration a track comprises a lead screw, a first carriage comprises a lead screw receiver including at least one of a nut and a ball assembly and is configured such that rotation of either the lead screw receiver and/or the lead screw moves the first carriage along the track.

Also disclosed herein are example embodiments in which a first carriage comprises at least one roller for rolling along the track. In one example embodiment a cutting system comprises a first deploying winch mechanically connected to a first deploying cable, the first deploying cable being fastened to the first carriage and configured such that rotation of the first deploying winch in a deploying direction exerts a force on the first deploying cable and moves the first carriage along the track in a direction from the first end towards the second end. In one example, a cutting system comprises a first retrieving winch mechanically connected to a first retrieving cable, the first retrieving cable being fastened to the first carriage and configured such that rotation of the first retrieving winch in a retrieving direction exerts a force on the first retrieving cable and moves the first carriage along the track in a direction from the second end towards the first end. In one particular embodiment, a cutting system comprises a spring assembly mechanically connected to a first retrieving cable, the first retrieving cable being mechanically connected to the first carriage and configured such that movement of the first carriage along the track in a direction from the first end towards the second end tensions the spring assembly. And in yet another particular embodiment, a first deploying cable comprises at least one of a metal and/or a polymer material.

Disclosed herein are example embodiments in which a cutting system includes at least one pulley configured such that a first deploying cable passes through a portion of the pulley. In one example configuration, a track comprises a first wall and a second wall, the first and second walls defining a channel, the channel being configured to accept a portion of the first carriage. In another example configuration, a channel comprises at least one curve. And in yet another example configuration, a track comprises a first stowage area at the first end of the track such that the first cutter is stowed when the first carriage is in the first stowage area. In one particular example, configuration a cutting system includes a hull next to the track and the track further comprises a first deployed area located further down the track from the stowage area in a direction of the second end of the track from the first end of the track, wherein the first cutter carriage and first cutter are configured to pass the first cutter through a slot in the hull when the first cutter is in the first deployed area, and wherein the first cutter carriage and first cutter are configured to retrieve the first cutter through a slot in the hull when the first cutter is in the first stowage area.

Disclosed herein are disclosed example embodiments, where a carriage comprises a cutter driver motor and the cutter driver motor is mechanically connected to the cutter through a mechanical drive linkage. In one particular embodiment, a mechanical drive linkage comprises at least two gears and a drive shaft. In one example, a mechanical drive linkage comprises at least one drive belt. And in another example, a cutter driver motor and an advancing motor are the same motor. And in yet another example embodiment, the cutter driver motor and the advancing motor are separate motors.

Disclosed herein are example embodiments wherein a cutter is mechanically connected to a fixed arm. In one example, a cutter is mechanically connected to a rotatable arm. In another example, a rotatable arm is rotated by a rotation motor. In another example a rotation motor and the rotatable arm are connected together though a clutch. And in yet another example a cutter is substantially disc shaped. In one disclosed embodiment, a cutter comprises at least one of a hardened straight edge, a hardened serrated edge, and an abrasive edge. And in another disclosed embodiment, an abrasive edge comprises at least one of diamond and/or tungsten carbide. In one example embodiment, a cutter comprises at least two blades configured to provide a cutting action when moved relative to each other. And in another example embodiment, a cutter is configured to rotate relative to and in-line with the track. And in yet another example embodiment, a cutting system further includes a second carriage configured to move along the track and a second cutter connected to the second carriage. Disclosed cutter systems include a cutting system including a second deploying winch mechanically connected to a second deploying cable, the second deploying cable being fastened to the second carriage and configured such that rotation of the second deploying winch in a deploying direction exerts a force on the second deploying cable and moves the second carriage along the track in a direction from the second end towards the first end. In one example, a cutting system includes a second retrieving winch mechanically connected to a second retrieving cable, the second retrieving cable being fastened to the second carriage and configured such that rotation of the second retrieving winch in a retrieving direction exerts a force on the second retrieving cable and moves the second carriage along the track in a direction from the second end towards the first end.

Disclosed example embodiments include a cutting system for an underwater vehicle, including a housing comprising a cutter driver motor, an arm connected to the housing, and a cutter connected to the arm, the cutter being substantially disc shaped and mechanically connected to the cutter driver motor through a mechanical drive linkage. In one example, a cutter comprises at least one of a hardened straight edge, a hardened serrated edge, and an abrasive edge. In another example, a cutting system is disclosed where the abrasive edge comprises at least one of a diamond and/or a tungsten carbide. And in another example, a mechanical drive linkage comprises at least two gears and a drive shaft. In one example embodiment, a mechanical drive linkage comprises at least one drive belt. In another example, an arm is fixed to the housing. And in yet another example embodiment, an arm is a rotatable arm rotatably connected to the housing and the cutter system further comprises a rotation motor mechanically connected to the rotatable arm and configured to rotate the rotatable arm from a first angle of rotation to a second angle of rotation. In one example embodiment, a rotation motor and the rotatable arm are connected together though a clutch. And in another example embodiment, a cutter system includes a hull, wherein a first portion of the cutter is on a first side of the hull at a first angle of rotation of the rotatable arm and the first portion of the cutter is on a second side of the hull at a second angle of rotation of the rotatable arm.

BRIEF DESCRIPTION OF THE DRAWINGS

FIG. 2B is a perspective view in accordance with the disclosed embodiments;

FIGS. 3A and 3B are opposite cross-sectional side views in accordance with the disclosed embodiments;

FIGS. 18A and 18B are perspective views in accordance with the disclosed embodiments.

DETAILED DESCRIPTION OF THE INVENTION

Figure 1:
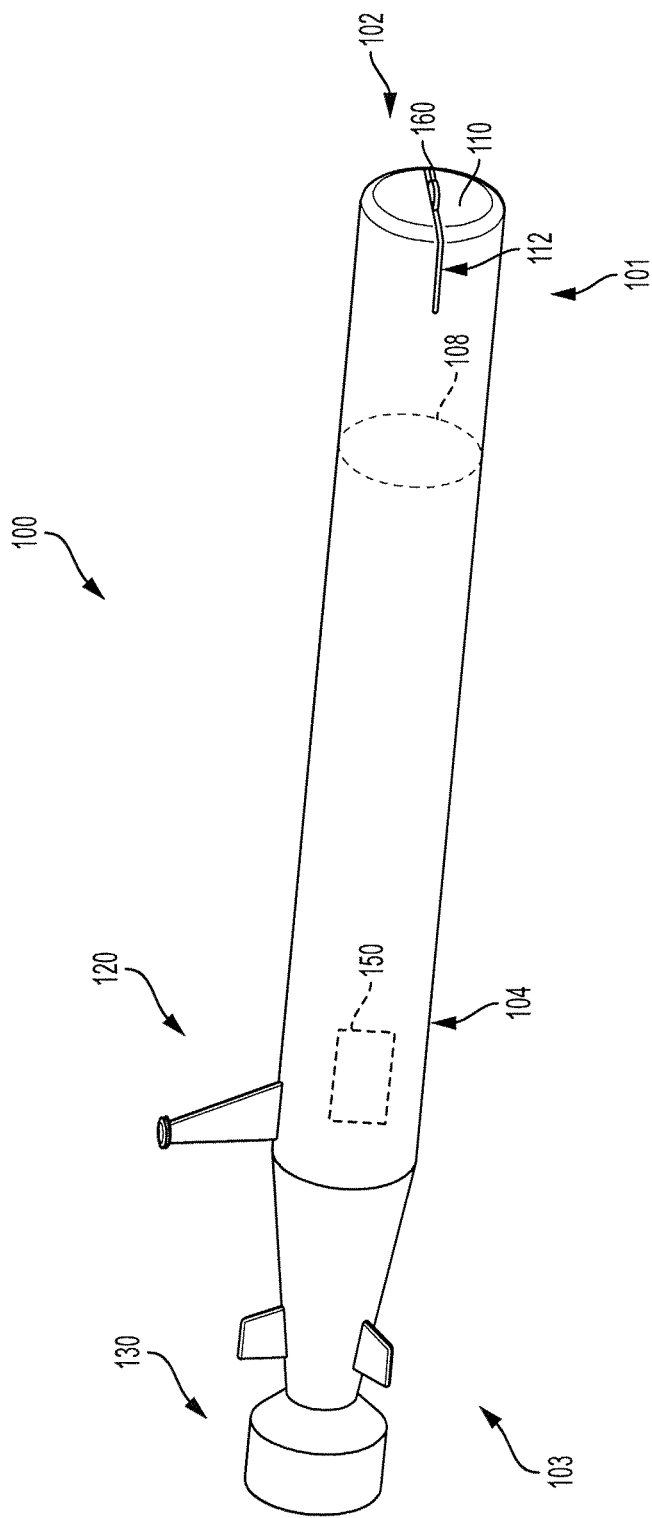
FIG. 1 is a perspective view in accordance with the disclosed embodiments.

In the following detailed description, reference is made to the accompanying drawings, which form a part hereof and illustrate specific embodiments that may be practiced. In the drawings, like reference numerals describe substantially similar components throughout the several views. These embodiments are described in sufficient detail to enable those skilled in the art to practice them, and it is to be understood that structural and logical changes may be made. Sequences of steps are not limited to those set forth herein and may be changed or reordered, with the exception of steps necessarily occurring in a certain order.

For larger underwater vehicles, the existing net penetration systems require large cutters having multiple slots penetrating through the nose. The large blades require deep slots in the nose. This reduces structural integrity in the nose to the point where support equipment such as forward looking sonars (FLS), thrusters and other equipment do not have a sound mounting location. In addition, the large deep slots take up valuable space in the front of the nose. Similarly, smaller underwater vehicles could also be improved with more increased space at the front of the nose. In addition, often nets or other obstructions contain wire reinforcement. In trying to penetrate the net, prior cutters might get caught on the wire reinforcement requiring loss in mission operating time or a diver to free it. If the vehicle is in hostile waters, it might be lost altogether or even worse, the vehicle could be retrieved by forces hostile to the US and our technology could be compromised. As we deploy more underwater vehicles for intelligence, surveillance, reconnaissance (ISR) missions, hostile countries could deploy wire filled nets to prevent the US from performing these operations. Embodiments disclosed herein provide methods and systems for cutting nets and obstructions using moveable cutter systems and methods and also for cutting reinforced wire nets and obstructions.

Various embodiments disclosed herein utilize a track system for moving a cutter along a portion of a USSV, for example, a portion of the nose on the forward part of an underwater vehicle. Various cutters and track systems will be discussed herein. Unless otherwise said, any of the disclosed cutter embodiment is interchangeable with any of the disclosed track system embodiments. By utilizing a track system to move a cutter position, smaller and/or fewer cutters can have an increased effect on nets or other obstructions. Thus a track system can reduce the weight by using smaller cutters and structural integrity impact by using smaller slots on underwater vehicles and also allows additional space for other underwater vehicle equipment. For example, various embodiments provide for a stowed or docked position in a aft portion of the nose preventing interference with other UUV equipment during normal operation.

The problem of penetrating through reinforced nets and other objects is solved by cutting the object using improved cutting assemblies. Disclosed embodiments, for example include hardened blades, hardened serrated edges, and/or abrasive cutters. Examples further include linear reciprocating cutters and or rotating disc cutters as well as track based moveable cutters. A cutting assembly that is attached to an underwater vehicle will cut a sufficiently large opening in the net, or through a tether line, to allow the vehicle to pass or be recovered.

Disclosed embodiments include systems and methods for penetrating through fishing nets and other objects, as well as various cutting apparatuses, including movable and/or rotating cutting systems for use in moving systems.

The invention may be used to particular advantage in the context of unmanned underwater vehicles traveling in areas with high fishing activity. Therefore, the following example embodiments are disclosed in the context of UUV systems. However, it will be appreciated that those skilled in the art will be able to incorporate the invention into numerous other alternative systems that, while not shown or described herein, embody the principles of the invention.

FIG. 1 shows a UUV system 100 in accordance with an embodiment described herein. UUV 100 has a forward end 101, an aft end 103, and a hull 104. At the forward end 101, the UUV has a front face 110 having a slot 112 in the hull 104 to allow a cutter, discussed further below, to protrude from the hull 104 in order to cut nets or other obstructions contacting the UUV 100. Forward end 101 may be separated from the remainder of UUV 100 by a water tight bulkhead 108. And alternatively, the forward end may be a removable pod attached externally to the front of UUV 100. Therefore the cutter can be easily installed, removed, and repaired at sea. At the aft end 103, UUV 100 has a propulsor 130 and hull protrusion 120. A controller container 150 containing a control processor for controlling the UUV 100, a memory for storing control software and an I/O processor is located in the rear bottom of UUV 100, although it shall be appreciated that the controller container 150 can be located anywhere in UUV 100. The control processor is the main processor for UUV 100 and will run the control instructions for the UUV and, in one configuration, also the cutter. Alternatively, the control instructions for the cutter may be run by an alternate cutter controller with or without communication from the control container 150. Power to the alternate cutter controller may be from controller container 150 or another UUV 100 power bus.

Figure 2A:
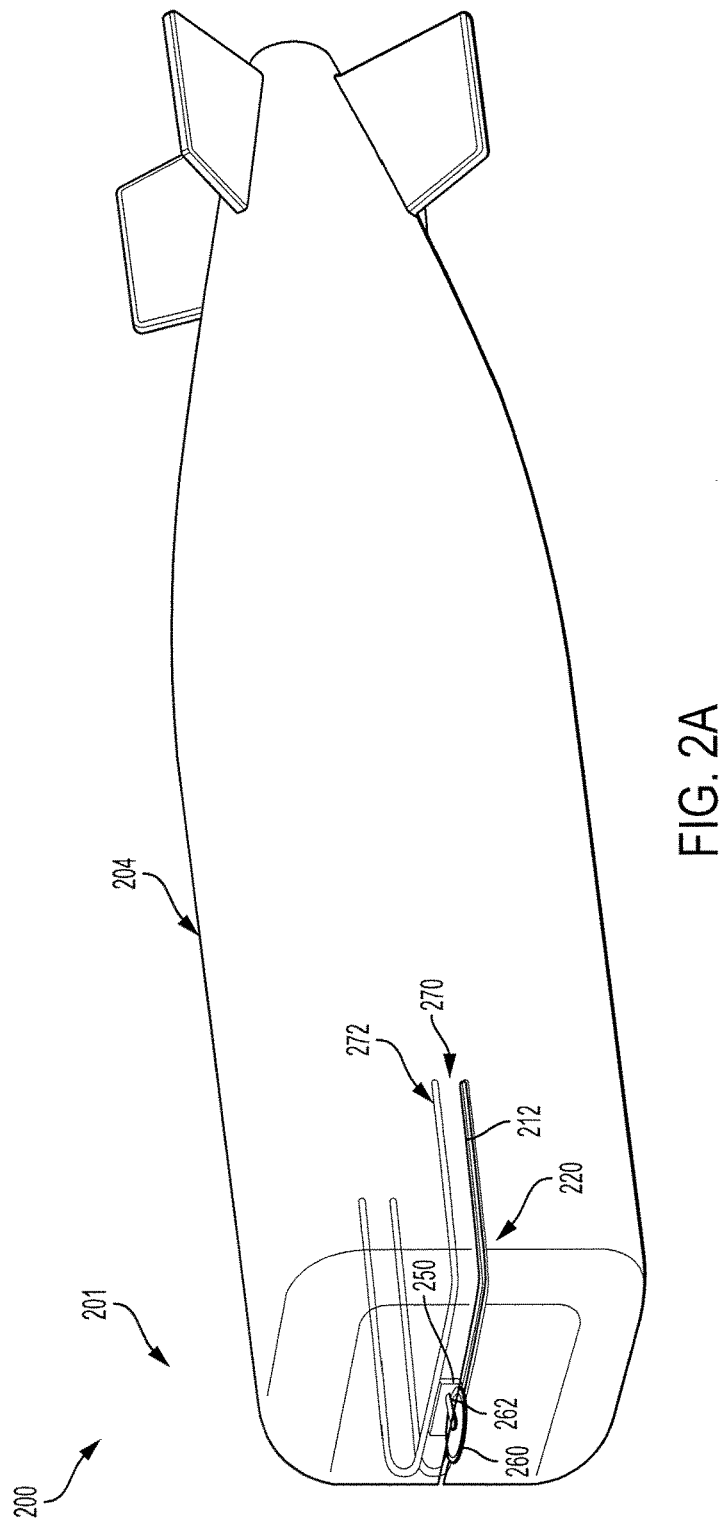
FIG. 2A is a perspective view in accordance with the disclosed embodiments.
Figure 2C:
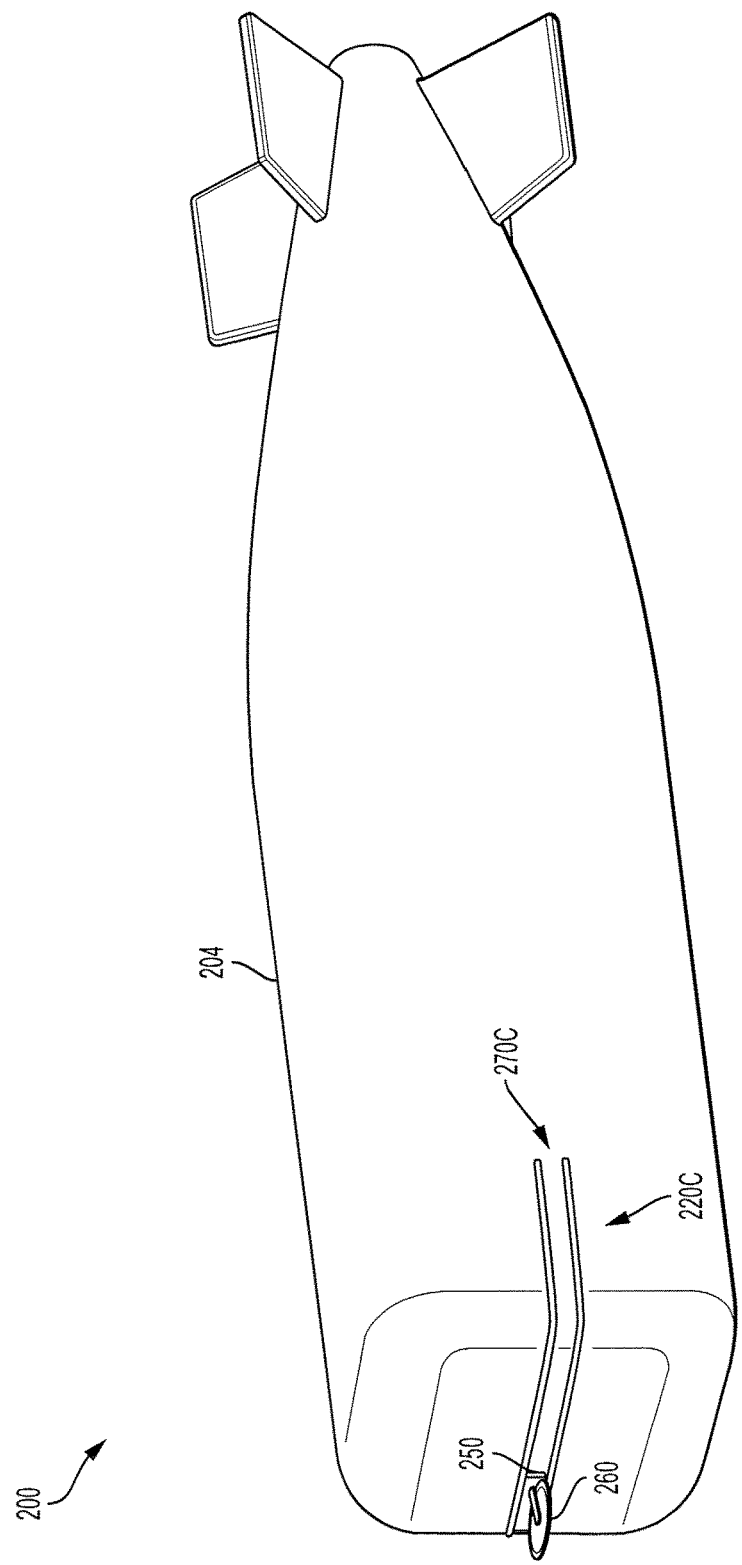
FIG. 2C is a perspective view in accordance with the disclosed embodiments.

FIGS. 2A, 2B, and 2C show profile views of an alternatively shaped UUV 200, having various cutter system embodiments. FIG. 2A shows a profile view of UUV 200 having cutter system 220. Cutter system 220 includes a track 270 having at least one rail 272 and at least one carriage 250 for engaging and moving along track 270. Carriage 250 includes a cutter 260, shown in this embodiment as a substantially disc-shaped cutter 260, connected to the carriage 250 via an arm 262. Other cutters, for example the linear cutter of the Adaptive Methods patents, may also be affixed to carriage 250. In FIG. 2A, the cutter system 220 is mounted on the inside of UUV 200 hull 204. It should be noted that the forward end 201 of UUV 200 may also be referred to as a nose and may be part of, or separate from, a pressure hull surrounding the remainder of the UUV 200. However, for the purposes of this disclosure "hull" will be generally refer to the outer surface of a UUV regardless of its function to maintain (or not maintain) pressure or water integrity. Hull 204 has a slot 212 sized to accommodate the cutter 260 as the carriage moves along the track 270 thus cutting nets or other obstructions.

FIG. 2B shows a profile view of UUV 200 having cutter system 220B. The cutter system 220B is similar to the cutter system 220 of FIG. 2A except cutter system 220B has a track 270B configured to form a channel 274. In one example, channel 274 may be formed by a first track wall 275 and a second track wall 276. Carriage 250 can include engagement pins 252 to engage with channel 274 and engagement pins 252 can further include rollers 254 to reduce friction between the carriage 250 and track 270B.

FIG. 2C shows a profile view of UUV 200 having cutter system 220C. The cutter system 220C is similar to the cutter system 220 of FIG. 2A except cutter system 220C is mounted outside the hull 204. Track 270C can be mounted to the hull 204 using any mounting or fastening system known in the art. An externally mounted cutter system 220C may be desired to retrofit UUVs 200 not designed with the space for an internally mounted cutter system 220 or not otherwise capable of accommodating a slot 212 in the hull 204 or other cutter system 220C elements.

Figure 3A:
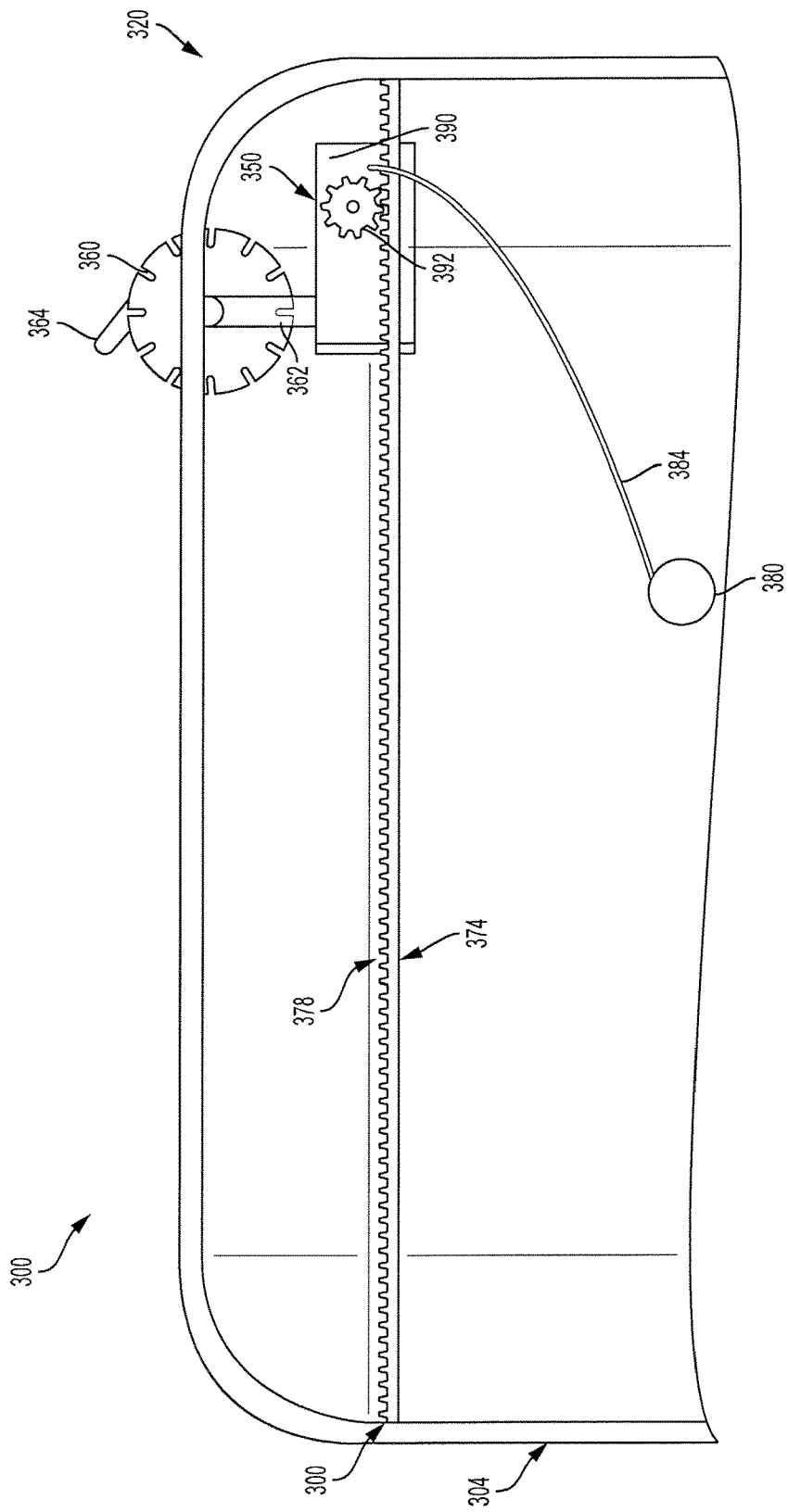
Figure 4:
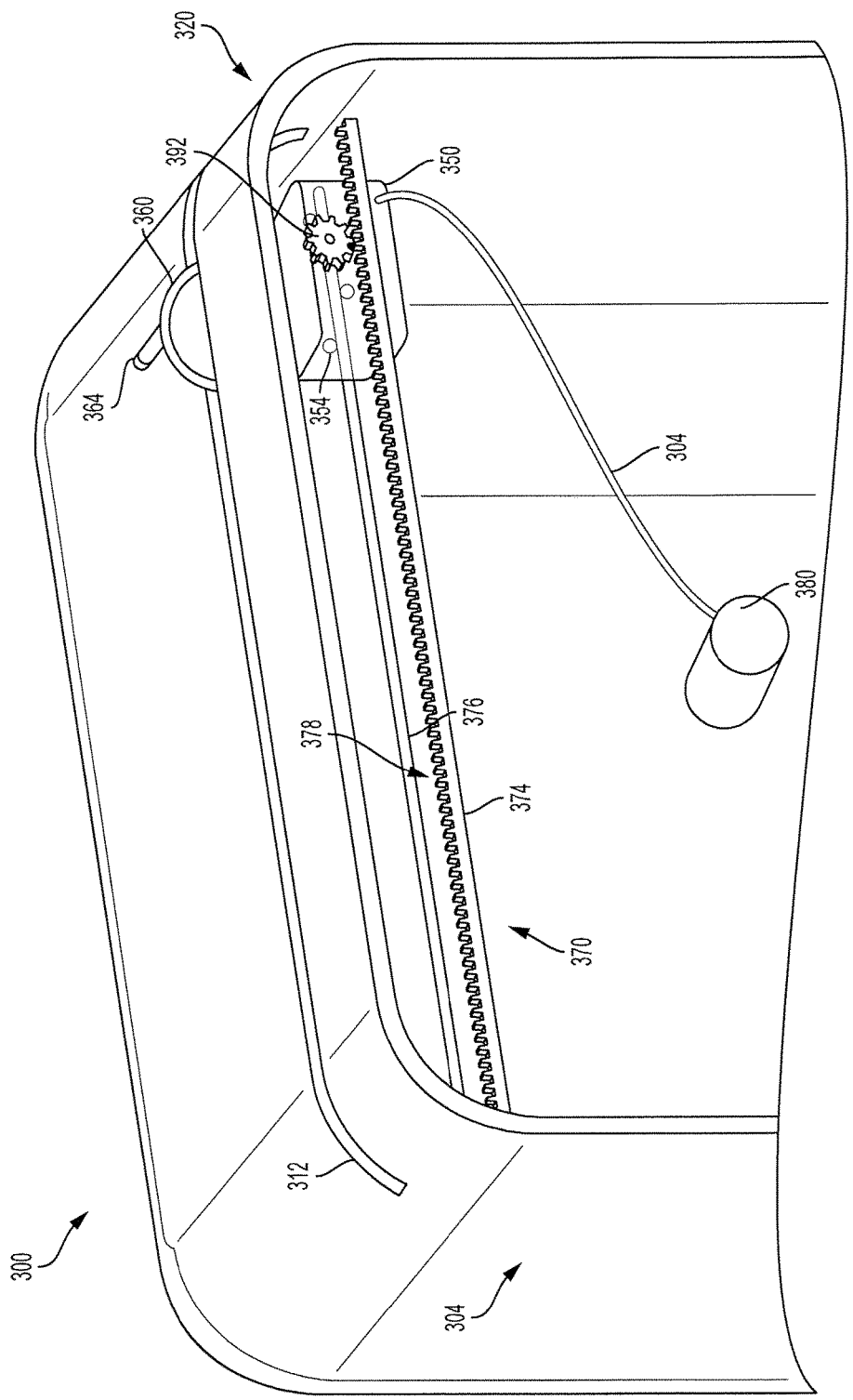
FIG. 4 is a perspective cross-sectional view in accordance with the disclosed embodiments.

FIGS. 3A, 3B and 4 show cross section views and a cross section profile view, respectively, of UUV 300 with cutter system 320. Cutter system 320 includes a track 370 (FIG. 4) having at least one rail and at least one carriage 350 for engaging and moving along track 370. As shown, the track 370 includes a first rail 374 and a second rail 376 (FIG. 3B), each of which are substantially straight. First rail 374 includes a toothed rack 378. Carriage 350 includes a cutter 360, shown in this embodiment as a substantially disc-shaped cutter 360, connected to the carriage 350 via an arm 362. The cutter, in one configuration, may also include a finger 364 connected to the arm 362 for holding a net or other obstruction against the cutter 360.

The carriage 350 can include a drive box 390 holding at least one motor for advancing the carriage 350 and/or driving the rotation (or in the case of a linear motor, the reciprocation) of the cutter 360. The drive box 390, for example, may include a single motor that outputs to a gearbox or other gear assembly. The gear assembly may have one or more outputs. For example, the gear assembly may have an output to drive the cutting action of the cutter 360 through a mechanical linkage and/or the gear assembly may have an output to a toothed gear mated with the toothed rack 378 for advancing the carriage across the track 370. For example, a single motor could have a gearbox which would reduce the motor speed to the speed required by the cutting disc or blade. A worm gear, driven off the output of the gearbox could then reduce the speed further and could be coupled to a spur gear and rack to move the cutting assembly across the nose. Alternately, a second gearbox could be used in place of the worm gear to reduce the speed to what is required by the spur gear and rack. In another example, the carriage 350 may include separate motors for advancing the carriage 350 and driving the cutting action of the cutter 360. For example, the carriage 350 may include an advancing motor for advancing the carriage across the track 370 and a cutter driver motor for driving the cutting action of the cutter 360. Carriage 350, in one example, includes roller 354 for engaging with track 370, as shown for example in FIG. 3B and FIG. 4 engaging with second rail 376. The rollers 354 and engaged rail 376 may, in one example, be suitably shaped to minimize and/or prevent rotation.

Each of first rail 374 and second rail 376 of track 370 are shown as being substantially straight. However, the track 370 may also be curved. In a curved track example, the size and tooth spacing of the toothed rack 378 and toothed gear 392 would be selected to account for the clearance required of the designed curve. The materials of the track 370, carriage 350, and related mechanical connections may be formed of any suitably film material sufficient to withstand the design operating environment and desired operating life. Harder/denser materials may offer longevity, but add possibly undesirable weight to the UUV 300, whereas less dense materials may wear quicker over time. Some non-exclusive materials include: metals (including aluminum, steel, stainless steel, coated steel and titanium), polymers (including nylon, high density polyethylene (HDPE)), carbon fiber, or any other anti-corrosive material.

Cutter system 320 includes cutter controller 380 connected to carriage 350 via control cable 384. Control cable 384 provides power and/or control signals to the carriage 350. Cutter controller 380 may receive power and control signals from another UUV 300 system and/or it may have independent control functions.

As shown in FIG. 4, Cutter 360 is supported over carriage 350 by arm 362 such that a portion of cutter 360 passes through slot 312 in hull 304 and is exposed to the outside of hull 304. Cutter 360 is disc shaped and may include different materials and configurations based on the expected operating environment and the known prevalence of obstruction materials. The cutter 360 can include any number of edges. For example, a non-exhaustive list includes, a hardened straight edge, a hardened serrated edge, and an abrasive edge. The cutter 360 can include any number of materials. For example, a non-exhaustive list includes, carbon steel, steel, diamond, tungsten carbide. Abrasive edges and hardened serrated edges are particularly useful in cutting this wire. However, they may also cut through softer materials like typical polypropylene nets.

In order to cut nets or other obstructions, the cutter system 320 is powered on or otherwise controlled through the cutter controller 380. Cutter controller may be integrated into another UUV 300 control system or operate independent with connections for power and signal as required. Either while the cutter 360 is attaining the desired rotation speed, or after the cutter 360 attains the desired rotation speed, the carriage 350 advances along the track 370 to cut the obstruction. Upon completion of the cut, the carriage, in one configuration is returned to its starting point. Additional modes of operation will be discussed below with additional embodiments.

Figure 5:
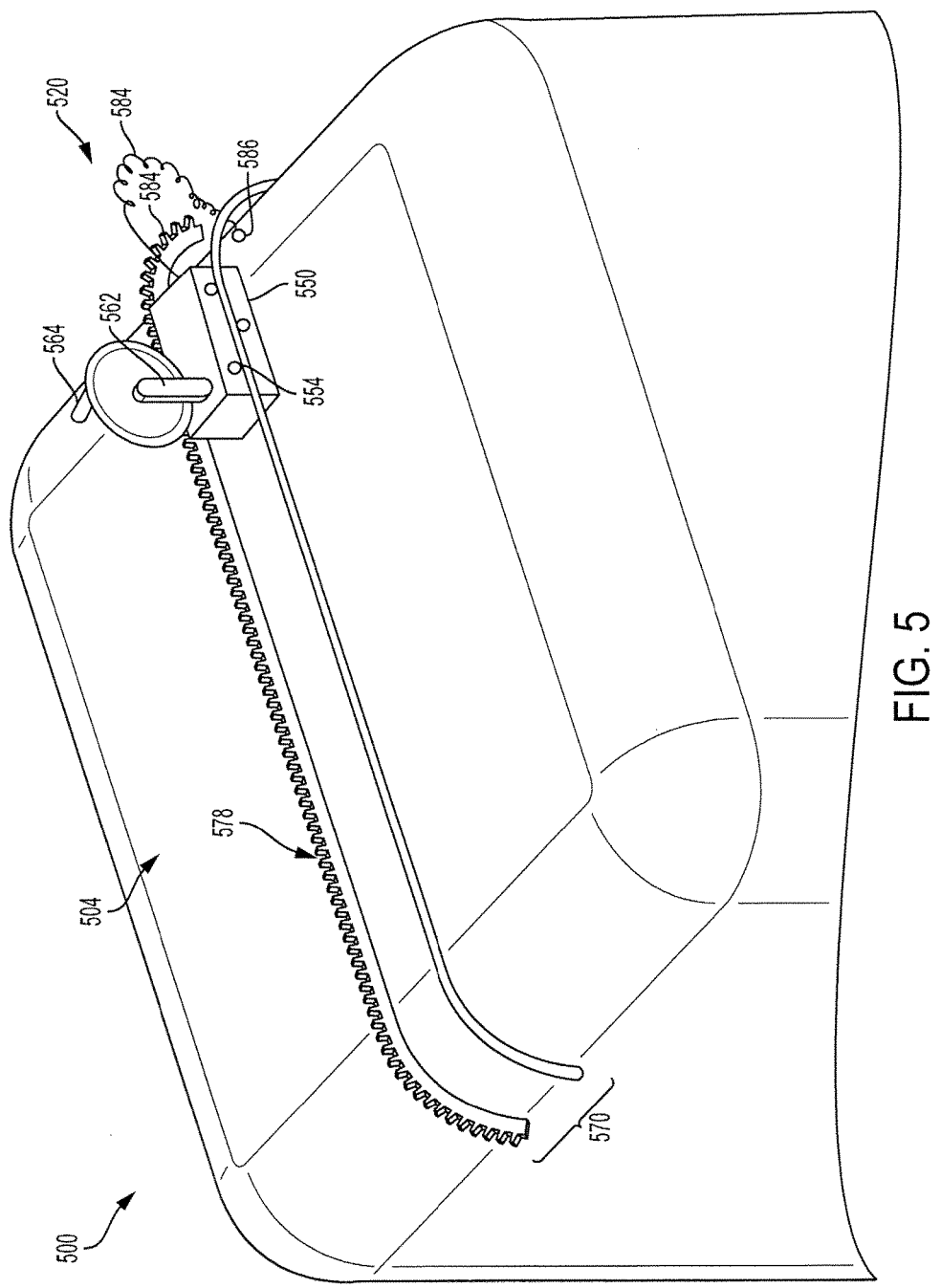
FIG. 5 is a perspective view in accordance with the disclosed embodiments.

FIG. 5 shows a profile view of UUV 500 with cutter system 520. The cutter system 520 is similar to the cutter system 320 of FIGS. 3 and 4, except that the track 570 of cutter system 520 is an external track with curved ends. Power and control for the carriage 550 may be provided through control cable 584 passing through hull 504, for example, through gland seal 586.

Figure 6A:
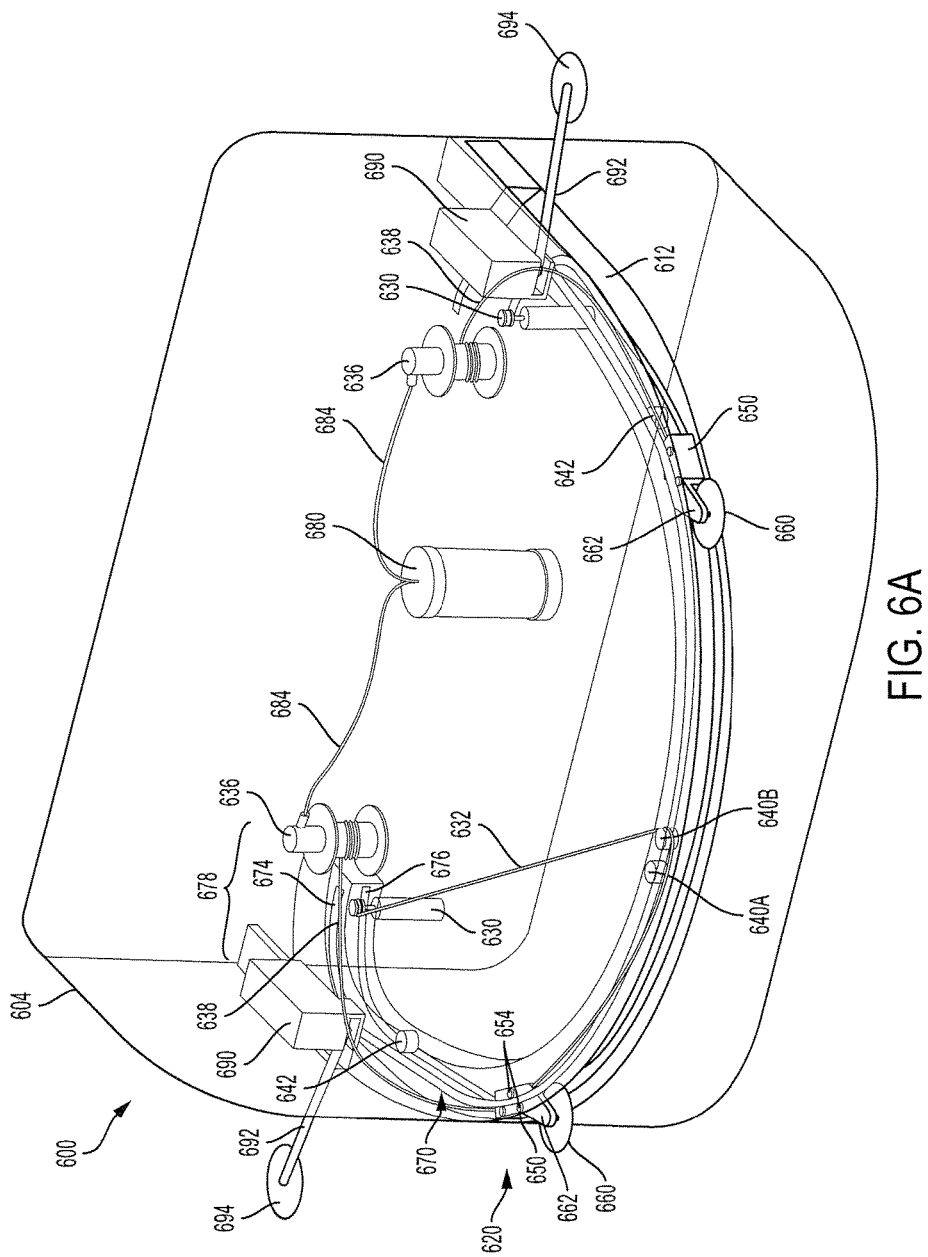
FIGS. 6A-C are perspective and top transparent views in accordance with the disclosed embodiments.

FIG. 6A shows a transparent profile view of the front end of UUV 600 with cutter system 620. Cutter system 620 includes a curved track 670 having a first rail 674 and a second rail 676. The curved track is shown as being symmetric and continuous from the port side of the UUV 600 to the starboard side of the UUV. However the track 670, in other embodiments may be of any configuration to achieve the desired cutter path. Further, the cutters in same cutter system 620 may have different materials to allow flexibility while deployed to escape different obstacles. For the purposes of this discussion, only one half of the cutter system, the starboard half, will only be discussed further except where otherwise noted. In addition some portions of system components which may be duplicated with multiple cutters have been omitted from certain figures to aid in particular views.

The cutter system 620 may include both moving carriages, for example carriage 650, and stationary carriages, for example stationary carriage 690. Stationary carriage may be included to increase the cut size of a net depending on the particular UUV configuration. The carriage 650, in one example, has rollers 654 for engaging and moving along track 670. Cutter system 620 includes deploying winch 630 mechanically connected to deploying cable 632. As shown, the deploying cable extends in a forward direction from the deploying winch 630 through an end pulley 640A and aft to mechanically connect to carriage 650. Due to the end pulley 640A, the deploying cable 632 is configured to apply a deploying force in a forward direction on carriage 650 when the deploying winch 630 is activated in a deploying direction.

Figure 6B:
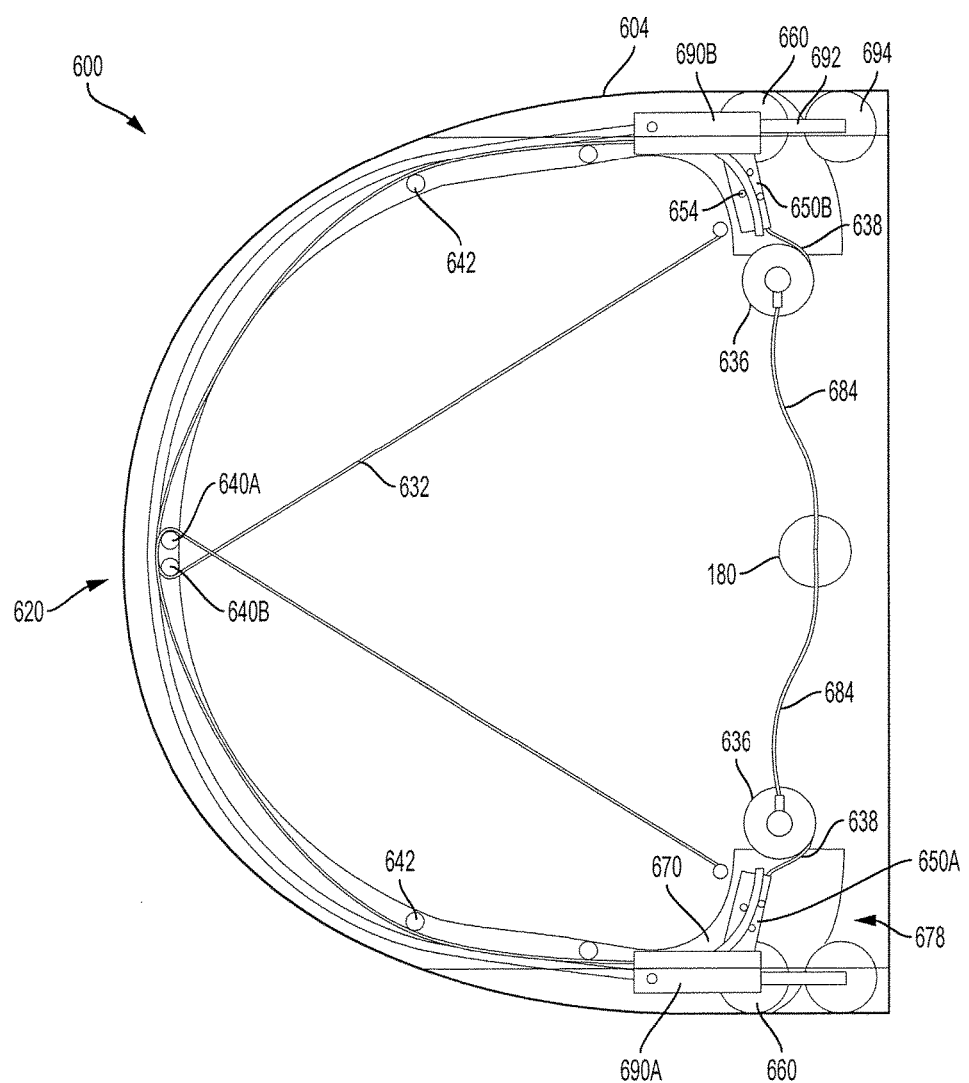
Figure 6C:
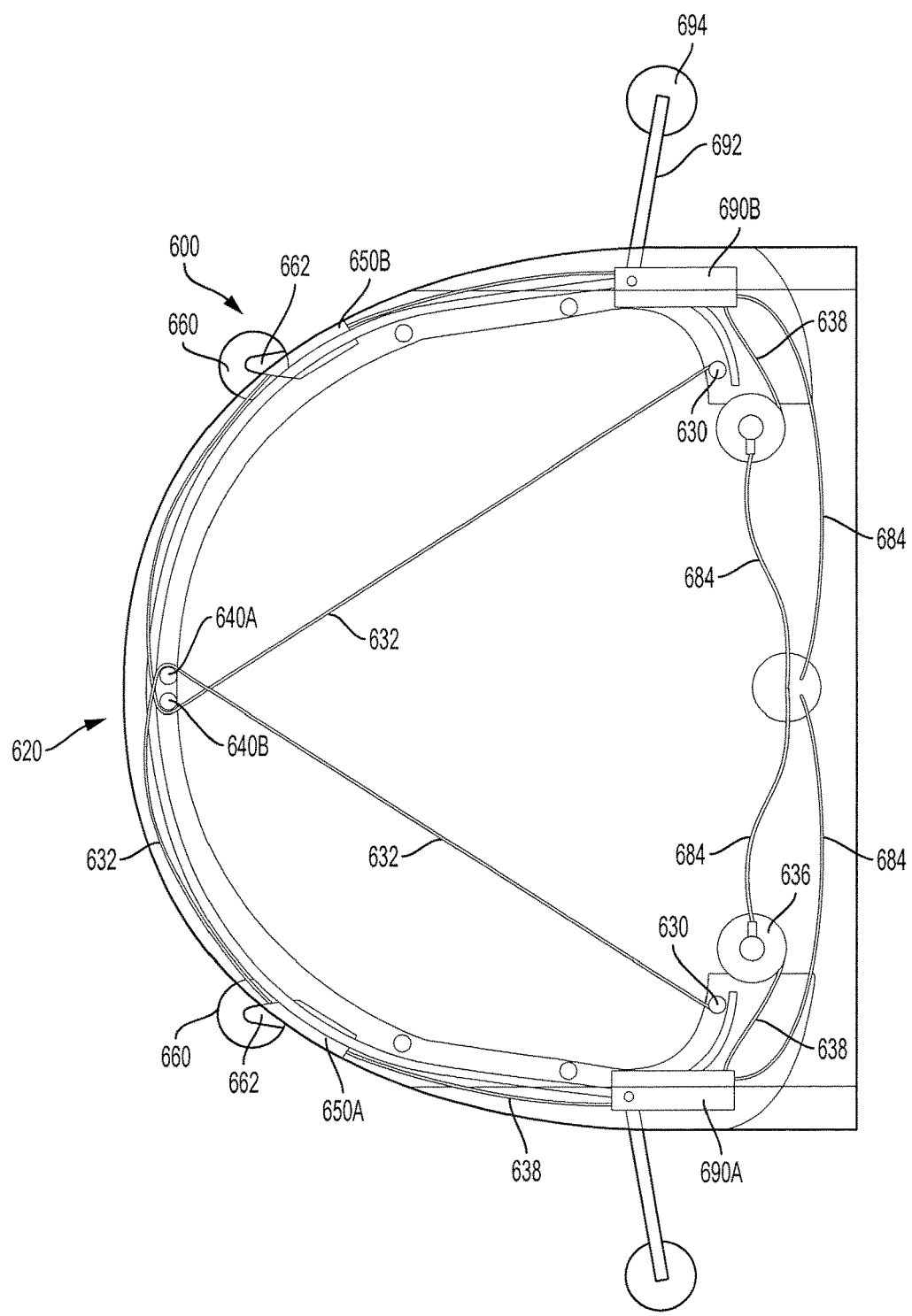

The cutter system 620 may include power cable reel 636 for maintaining a spool of control cable 684 for powering the cutter 660 on carriage 650. In FIGS. 6A-6C, the control cable 684 is also a retrieving cable used to move the carriage in an aft direction. The power cable reel 636 may include a motor or a mechanical spring assembly for applying a retrieval force on the control cable 684. As the deploying winch 630 moves the carriage 650 in a deploying direction, the power cable reel 636 is configured to payout control cable 684 either via rotation of a motor or a mechanical spring assembly. In one example using a mechanical spring assembly, the force of the deploying winch 630 pulling the carriage 650 stores energy in the mechanical spring assembly, which may be later used for carriage 650 retrieval. After completion of the cutting cycle, the deploying winch 630 may release tension and/or operate in a reverse direction paying out deploying cable 632 and the power cable reel 636 may either release the mechanical spring assembly or operate the motor to retrieve the carriage 650. The power reel assembly 636 may be any motor known in the art including, but not limited to, electromechanical, pneumatic, and hydraulic motors. Similarly, the mechanical spring assembly may be a spring assembly known in the art including, but not limited to linear, torsion, spiral, and recoil spring assemblies. Further the mechanical spring assembly can be a cable retractor, a ratcheting spring assembly, or the like with a release. Cutter system 620 may also include additional cable guides 642 as needed for a particular track 670 configuration to guide the deploying cable 632 and control cable 684 around the track 670. Deploying cable 632 may be made out of any suitable material. For example a non-exclusive list of suitable deploying cable materials includes: metals (including aluminum, steel, stainless steel, coated steel and titanium), polymers (including nylon, high density polyethylene (HDPE)), carbon fiber, or any other anti-corrosive material.

Carriage 650 and/or stationary carriage 690 may have either a fixed arm, such as arm 662, or a rotatable arm, such as arm 692, which will be discussed further below. Stationary carriage 690 is positioned inside hull 604 and has a rotatable arm 692. The distance of stationary carriage 690 from hull 604 and the length of rotatable arm 692 is chosen such that as the stationary carriage 690 pivots the rotatable arm 692, the cutter 694 moves from inside the hull 604 through slot 612 to outside the hull in order to cut a net or other obstruction. Upon completion of the cutting cycle, the rotatable arm can rotate back inside the hull 104 for stowage.

A portion of track 670 may be located respectively further inboard from hull 604 than another portion of track 670 establishing a stowage area 678 of track 670 such that when the carriage 650 is moved into the stowage area 678 of track 670, more of the cutter 660 is located within hull 604 than when the carriage 650 in not in the stowage area. Or in the alternative, when the carriage 650 is in the stowage area 678, the cutter 660 is entirely within hull 604 (FIG. 6B). The location of the stowage area 678 is determined by the shape and location of the track 670.

In one example, as shown in FIG. 6B the end pulley 640A associated with the port side carriage 650 is located on the other side of the end pulley 640B associated with the starboard side carriage 650B. This overlapping configuration allows full cutter coverage of the front end of UUV 600. In the overlapping configuration, in one example, the port side carriage 650 may deploy fully and at least be partially retrieved prior to the starboard side carriage being fully deployed. Therefore full cutter coverage may be obtained without interference. In one example, the deploying cables may also be offset in at least one dimension to prevent further interference.

FIG. 6B shows carriages 650A, 650B and stationary carriages 690A, 690B in a stowed position. FIG. 6C shows carriages 650A, 650B and stationary carriages 690A, 690B in a deployed position. It should be noted that FIGS. 6B and 6C do not show the full range of motion of the individual carriages and cutters.

Figure 7A:
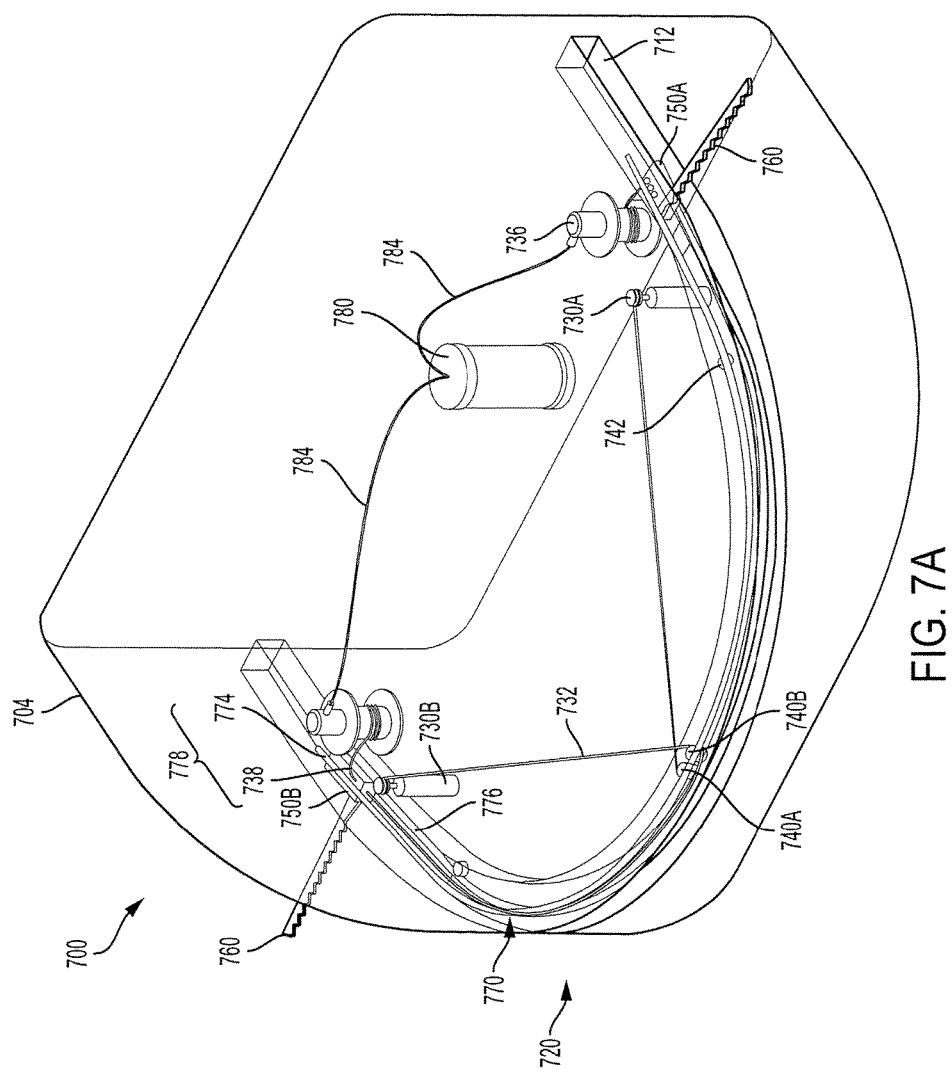
FIGS. 7A-D are perspective and top transparent views in accordance with the disclosed embodiments.
Figure 7B:
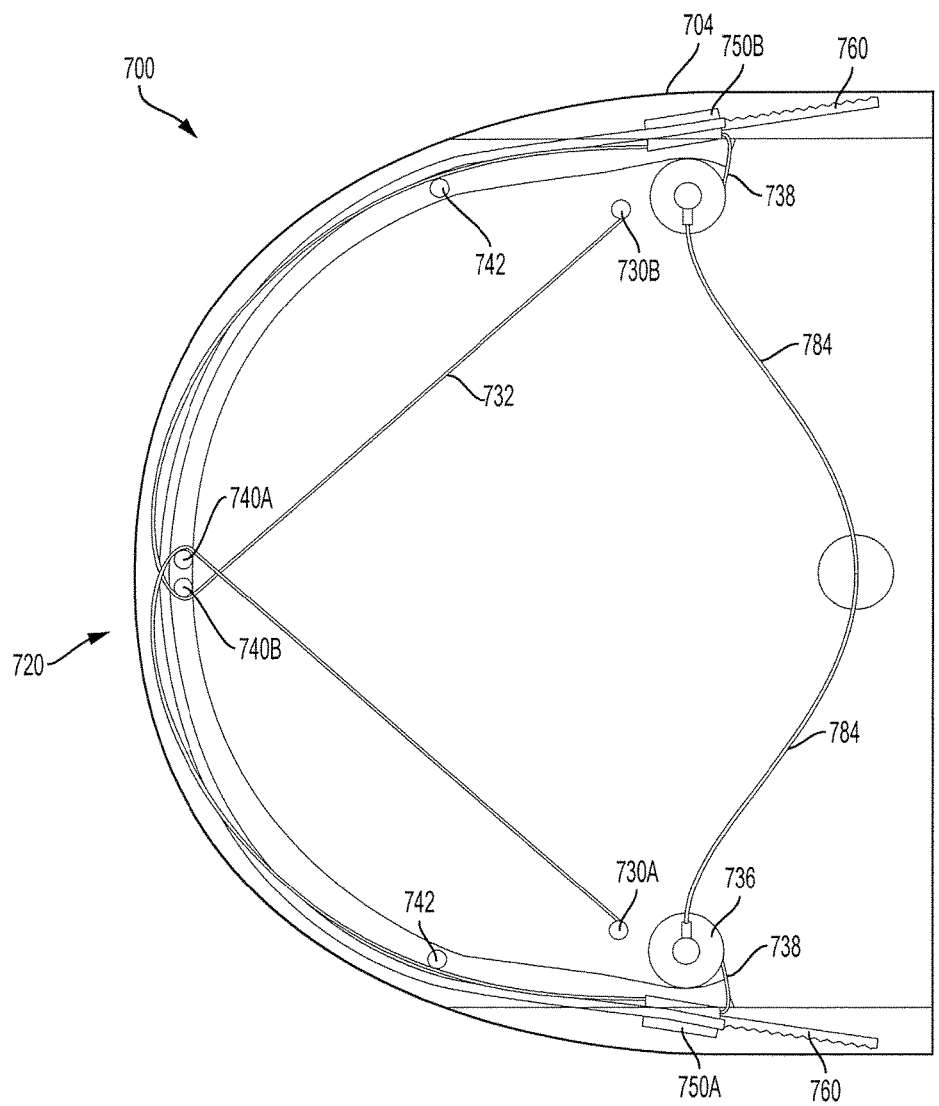
Figure 7C:
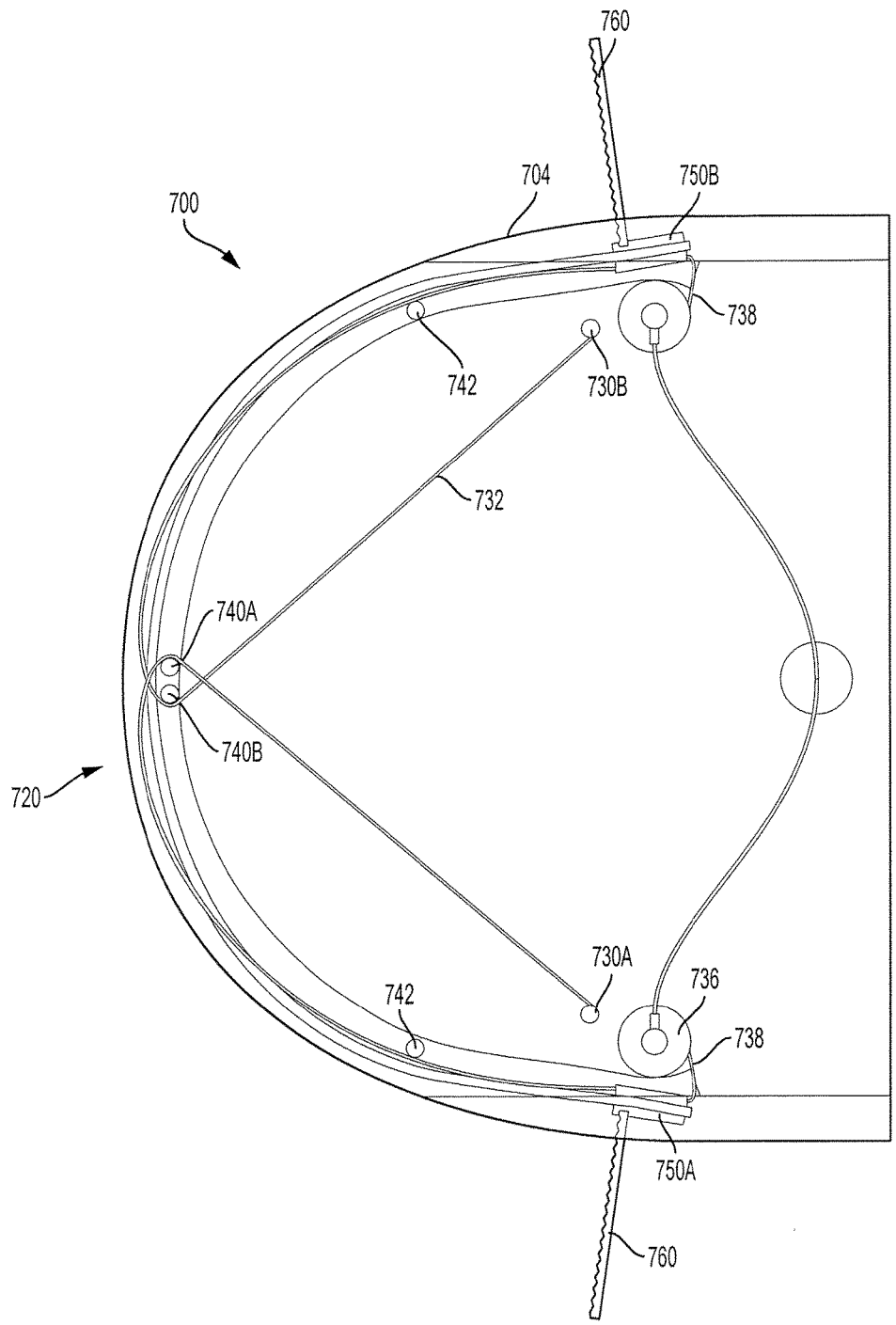
Figure 7D:
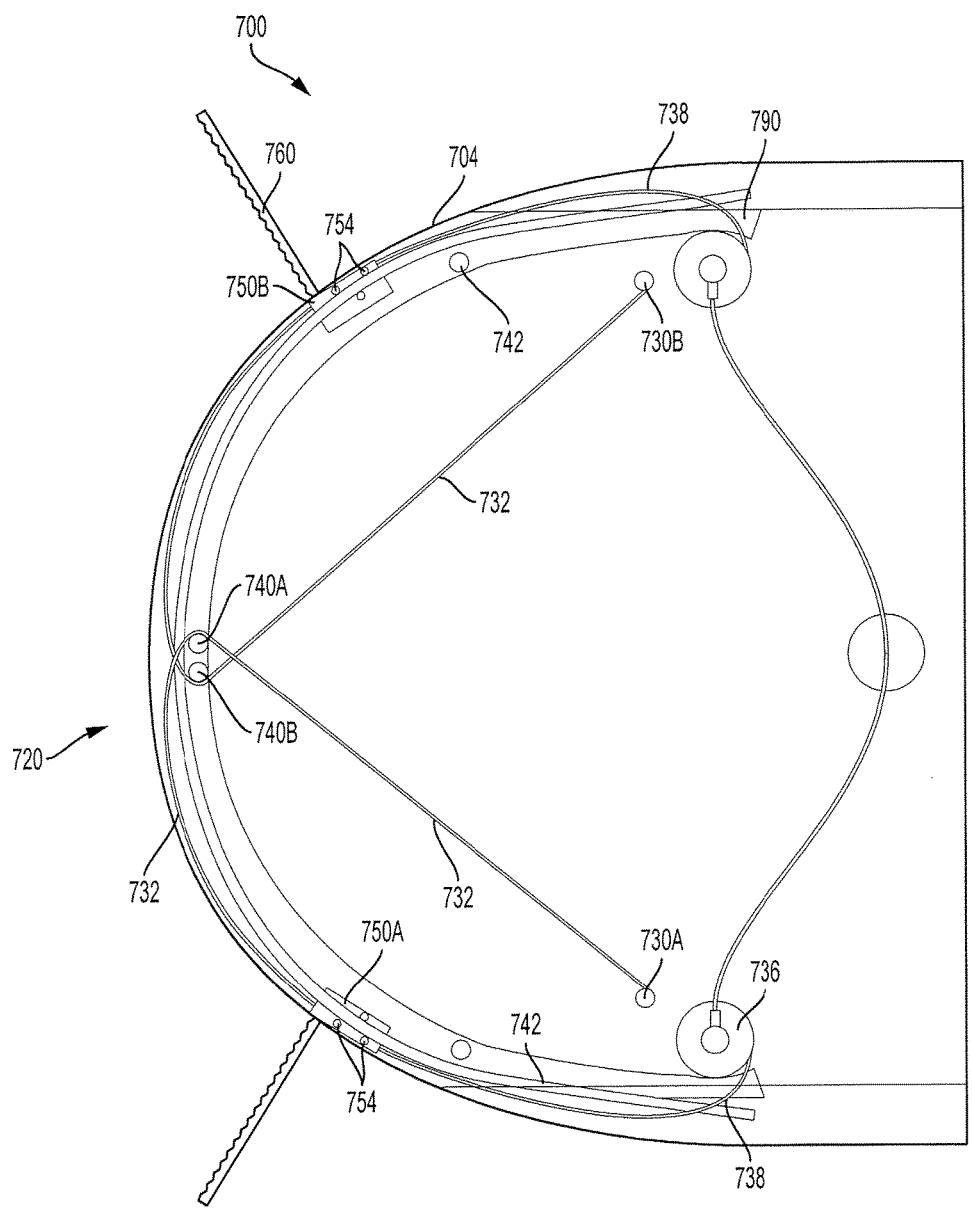

FIGS. 7A-7D shows a similar UUV 700 with cutter system 720 as UUV 600 with cutter system 620, only the carriage 750 includes a linear cutter 760. Linear cutter 760 may be, for example any of the linear cutters described in the Adaptive Methods patents or another reciprocating cutter. Linear cutter 760 may use, as non-limiting examples, a toothed edge blade, a serrated blade, a hardened straight edge, a hardened serrated edge, or an abrasive edge. The cutter 760 is rotatable with respect to the carriage 760. Because the cutter 760 is rotatable, the cutter 760 may be stowed in storage area 778 by rotating the cutter either forward or aft without necessitating an additional curve in track 770. Similarly, and in alternative example, this would also apply to a carriage 760 including a disc shaped cutter on a rotatable arm. FIG. 7B shows carriages 750A, 750B in a stowed position. FIGS. 7C and 7D show carriages 750A, 750B in various deployed positions. It should be noted that FIGS. 7C and 7D do not show the full range of motion of the individual carriages and cutters.

Figure 8:
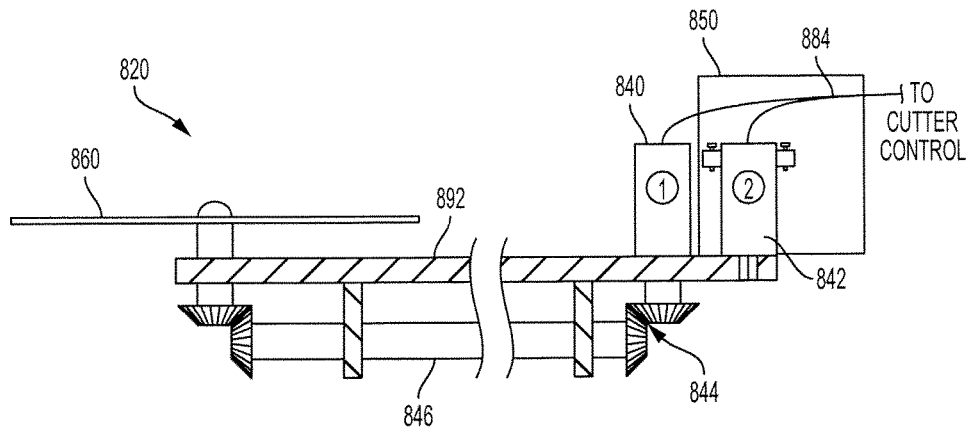
FIG. 8 is a side view in accordance with the disclosed embodiments.
Figure 9:
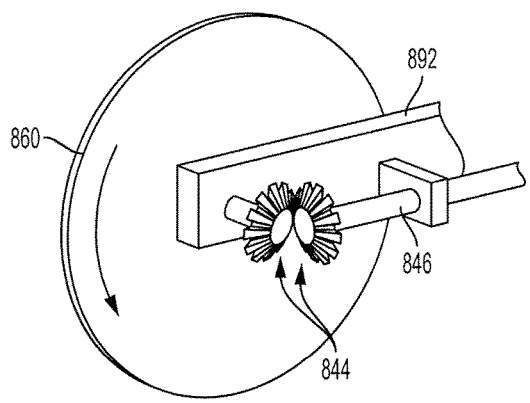
FIG. 9 is a perspective view in accordance with the disclosed embodiments.
Figure 10:
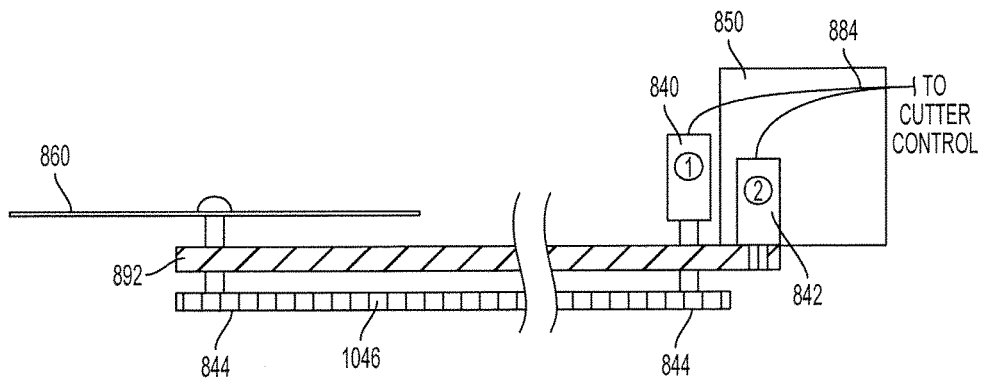
FIG. 10 is a side view in accordance with the disclosed embodiments.
Figure 11:
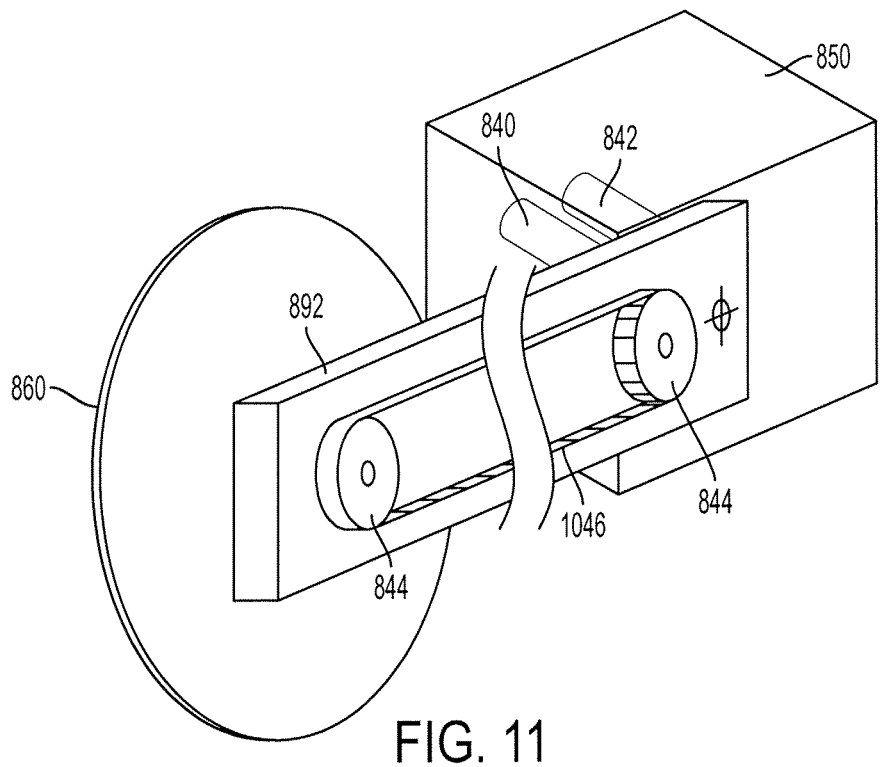
FIG. 11 is a perspective view in accordance with the disclosed embodiments.

FIG. 8 shows example features of a cutter system 820. Carriage 850 includes arm 892 mechanically linked to carriage 850 via arm rotation motor 840. Cutter driver motor 842 may, in one example, be mounted on arm 892 to permit continuous movement of cutter 860 through numerous degrees of rotation of arm 892. In this example, arm 892 is rotatable. However, arm 892 may also be fixed directly to carriage 850 without arm rotation motor 842, in which case cutter driver motor may be located in alternative locations, for example on, in, or otherwise affixed to carriage 850. Cutter driver motor 840 and arm rotation motor 842 are electrically connected to cutter controller (not shown). Cutter driver motor 840 is mechanically linked to drive cutter 860. In one example, as shown in FIGS. 8 and 9, the mechanical linkage is through a series of gears 844, for example bevel gears, and a shaft(s) 846. The mechanical linkage, may also be through one or more belts 1046 (FIGS. 10 and 11), chains, and related gears or sprockets.

Figure 12:
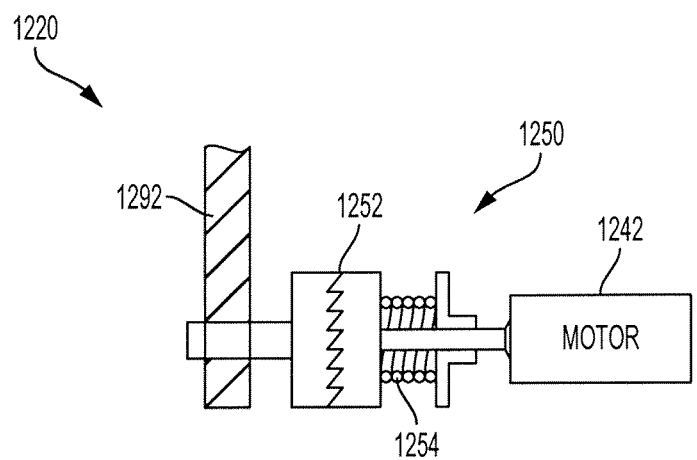
FIG. 12 is a side view in accordance with the disclosed embodiments.

FIG. 12 shows an example mechanical linkage between arm 1292 and arm rotation motor 1242 of cutter system 1220. The example mechanical linkage includes a clutch assembly 1250, which may include a toothed clutch 1252 and a spring 1254. During operation of the cutter system 1220, particularly when arm rotation motor 1242 is operating, when the arm 1292 meets sufficient resistance, its forward motion will slow and the clutch assembly 1250 will slip, providing more time to cut through the net. It will be appreciated by those skilled in the art that the clutch assembly 1250 may need to be geared to allow better net engagement.

Figure 13:
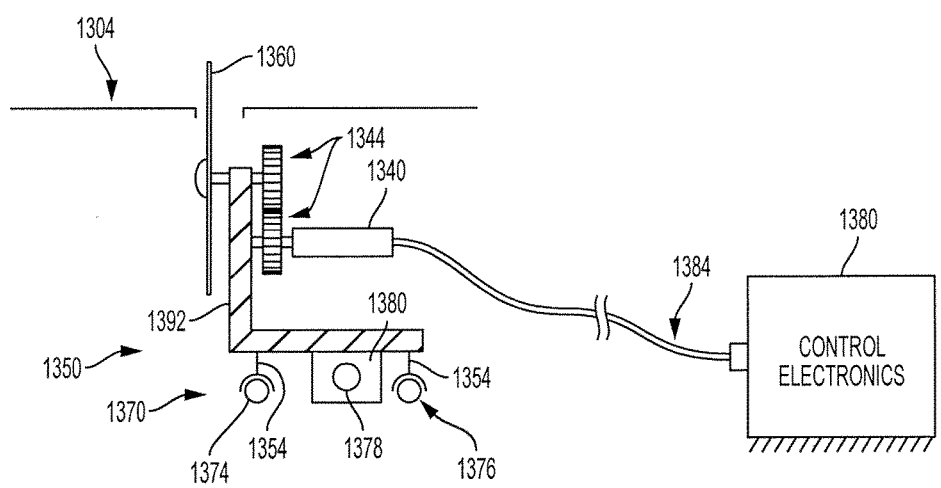
FIG. 13 is a side view in accordance with the disclosed embodiments.

FIG. 13 shows an example cutter system 1320 with UUV 1300 having hull 1304. Carriage 1350 has an arm 1392 in a fixed position with respect to and connected to carriage 1350. Cutter 1360 is mechanically linked to arm 1392 and cutter driver motor 1340. The cutter driver motor 1340 drives cutter 1360 through gear 1344. Cutter 1360 may be made of similar construction and similar materials to those described above. Cutter driver motor 1340 is electrically connected to cutter controller 1380 via control cable 1384. Carriage 1350 rests on track 1370 through guides 1354. Carriage 1350 is connected to a nut 1380, or in another example, a ball assembly engaged with a lead screw 1378, which is connected to an advancing motor (not shown). Operation of the advancing motor in either direction will move the carriage 1350 along the lead screw in a corresponding direction. In an alternative example, a nut or ball assembly may be mounted to an advancing motor on the carriage 1350 so that rotation of the nut or ball assembly will advance the carriage 1350 along the lead screw.

Figure 14:
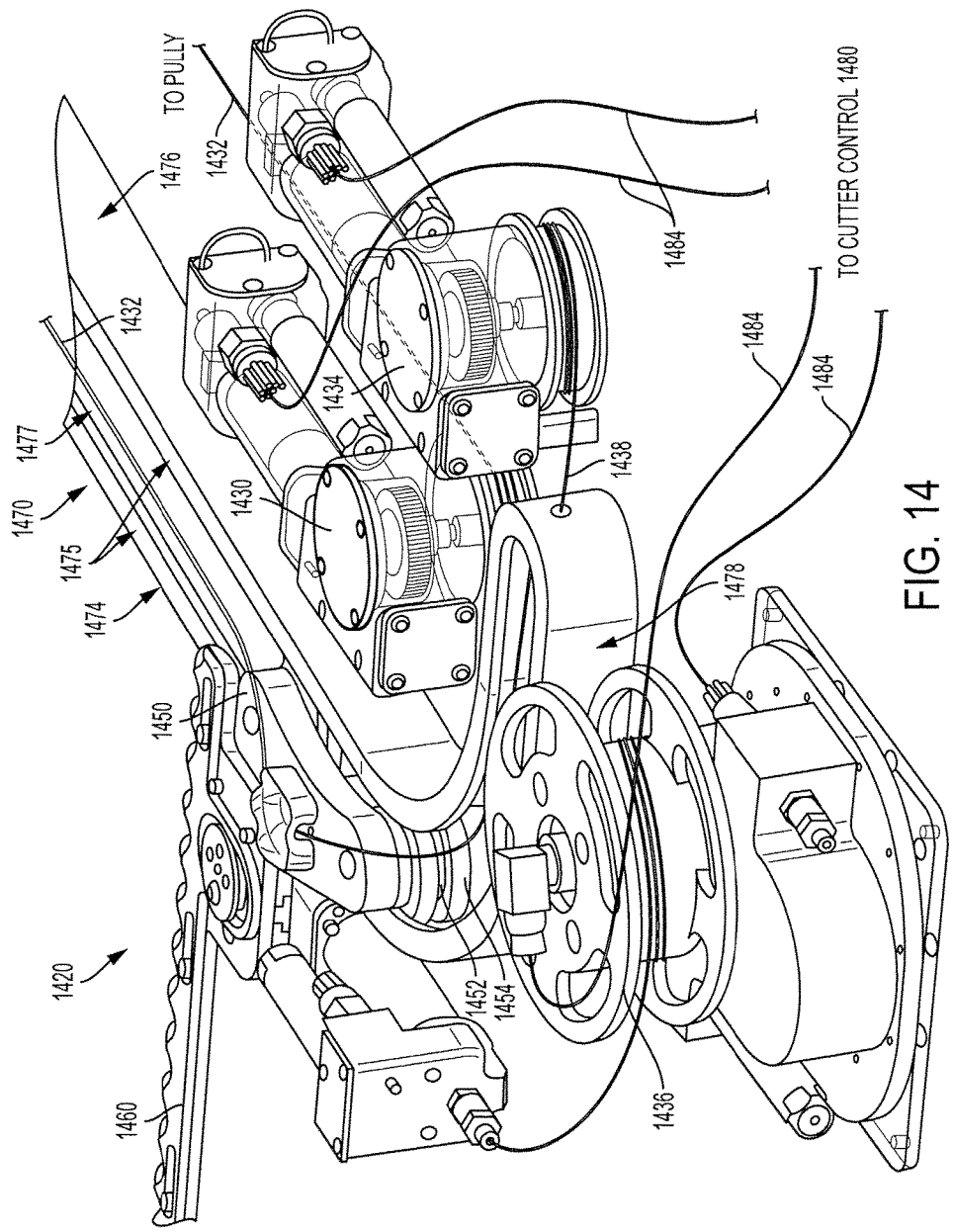
FIG. 14 is a perspective view in accordance with the disclosed embodiments.

FIG. 14 shows an example cutter system 1420 similar to cutter system 720 (FIG. 7). The port side portion of the cutter system 1420. In one example, similar system components are present on the starboard side. Cutter system 1420 includes track 1470. Track 1470 includes a first track wall 1474 and second track wall 1476, which together form a channel 1477. First and second track walls 1474, 1476 may further include an angled portion 1475 for retaining engagement pins 1452 of carriage 1450. Engagement pins 1452, in some embodiments, include rollers 1454 for reducing friction between carriage 1450 and track 1470. Track 1470 includes a curved portion to establish a stowage area 1478 of track 1470.

Cutter system 1420 includes power cable reel 1436. However, unlike power cable reel 736 (FIG. 7), power cable reel 736 does not serve as the primary retrieval force for the carriage 1450. Cutter system 1420 includes at least two winches, for example, a deploying winch 1430 and a retrieving winch 1434. Each of deploying winch 1430 and retrieving winch 1434 may include motors which are electrically or otherwise connected to cutter controller 1480. Each of deploying winch 1430 and retrieving winch 1434 may include any motor known in the art including, but not limited to, electromechanical, pneumatic, and hydraulic motors.

Deploying winch 1430 is mechanically connected to deploying cable 1432. As shown, the deploying cable extends in a forward direction from the deploying winch 1430 and enters the channel through an opening in track 1470 (not shown). In another embodiment, an end pulley (not shown) may also be used to direct the deploying cable 1432 into the channel. The deploying cable 1432 continues aft and mechanically connects to carriage 1450. The deploying cable 1432 is configured to apply a deploying force in a forward direction on carriage 1450 when the deploying winch 1430 is activated in a deploying direction.

Retrieving winch 1434 is mechanically connected to a retrieving cable 1438 and is configured to apply a retrieval force on the retrieving cable 1438. As the deploying winch 1430 moves the carriage 1450 in a deploying direction, the retrieving winch 1434 is configured to payout retrieving cable 1438 via active or passive rotation of the retrieving winch 1434. In one example, retrieving winch 1434 may include mechanical or electrical braking to maintain tension on the retrieving cable 1438.

After completion of the cutting cycle, the deploying winch 1430 may release tension and/or operate in a reverse direction paying out deploying cable 1432 and the retrieving winch 1434 may operate to retrieve the carriage 1450. Similarly, the mechanical spring assembly may be any spring assembly known in the art including, but not limited to, linear, torsion, spiral, and recoil spring assemblies. Power cable reel 1436 may include a motor for paying out and retrieving control cable 1484 connecting to the cutter. In another embodiment, power cable reel 1436 includes a spring assembly to maintain tension on the control cable 1484 connecting to the cutter. As shown, cutter system 1420 includes a linear reciprocating and non-rotating cutter 1460. However carriage 1450 may also be used with a rotating linear cutter, a fixed disc shaped cutter, or a disc shaped cutter with a rotatable arm.

Figure 15:
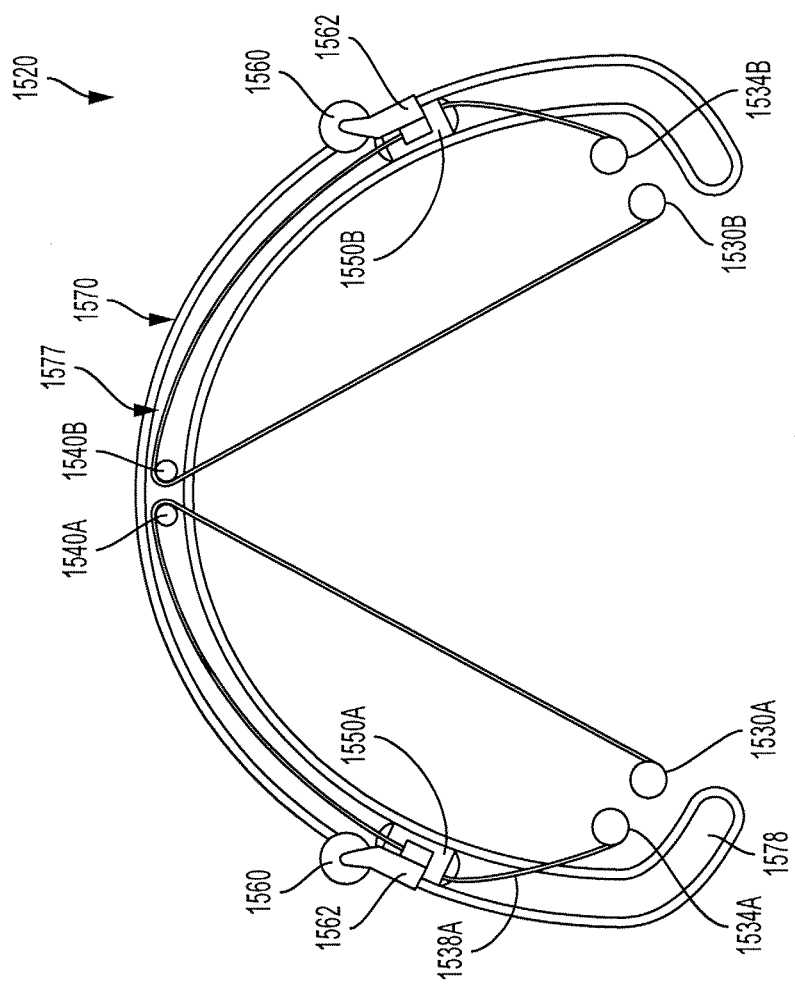
FIGS. 15 and 16 are top views in accordance with the disclosed embodiments.

FIG. 15 shows a schematic overview of a cutter system 1520 similar to cutter system 1420 (FIG. 14) with a fixed disc shaped cutter 1560. Portions of cutter system 1520 have been left out for clarity. Cutter system 1520 includes deploying winches 1530A and 1530B, deploying cables 1532A and 1532B, retrieving winches 1534A and 1534B, carriages 1550A and 1550B. In this example, the deploying and retrieving winches associated with carriage 1550A, that is deploying winch 1530A and retrieving winch 1534A, are on the same end of track 1570 as each other. In this arrangement, the deploying cable 1532A must change directions, for example through end pulley 1540A in order to exert deploying force on carriage 1550A.

Figure 16:
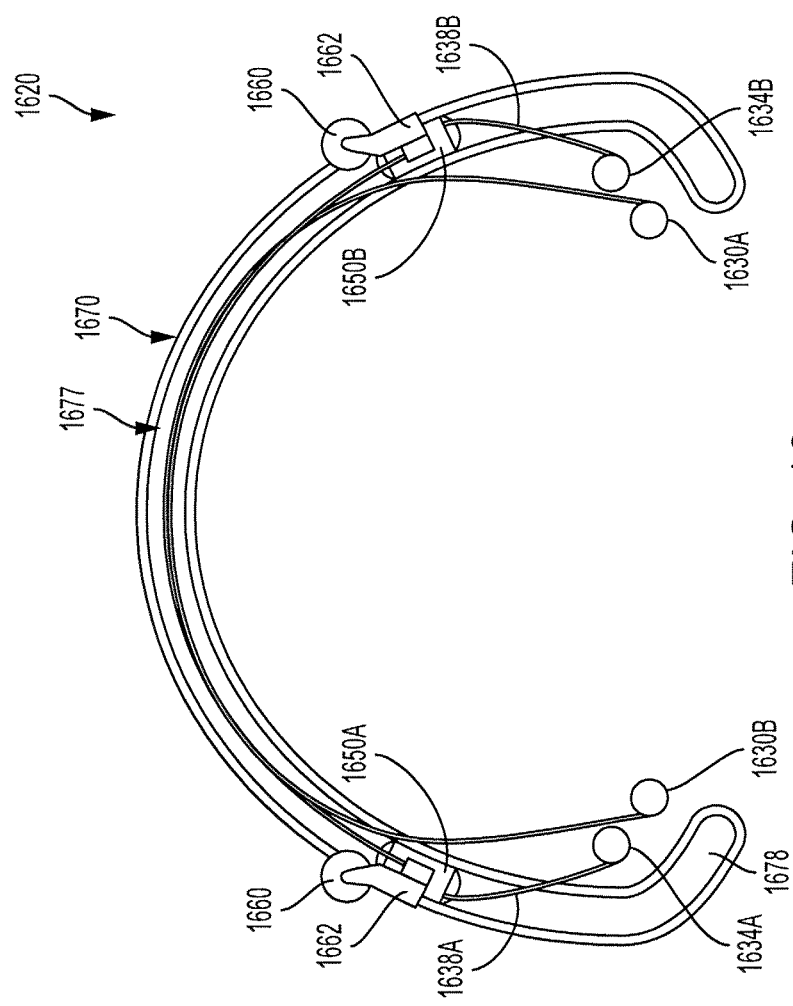

FIG. 16 shows an alternative schematic overview of a cutter system 1620 similar to cutter system 1520 (FIG. 15). In this example the deploying winch associated with the respective carriage, for example, deploying winch 1630A associated with carriage 1650A, is on the opposite side of track 1670 from the associated retrieving winch. That is, deploying winch 1630A and retrieving winch 1634A are located on opposite ends of track 1670 from each other. In this arrangement, friction and cable guide complexity can be reduced in the associated deploying cables and related systems.

Figure 17A:
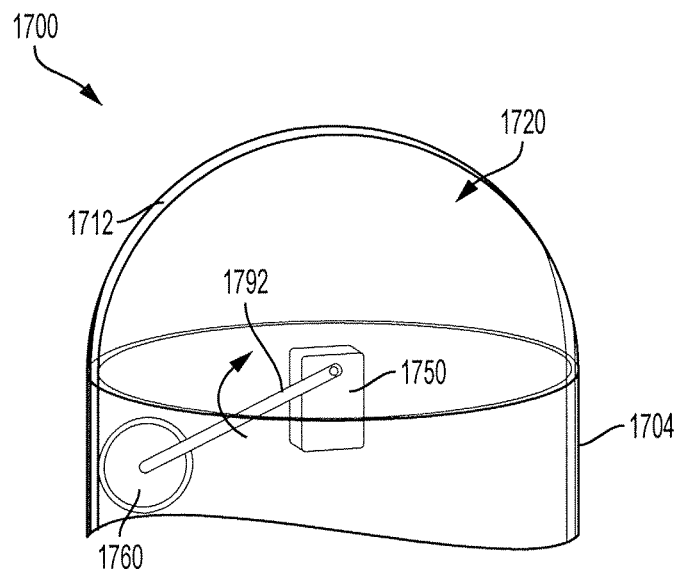
FIGS. 17A and 17B are perspective cross-sectional transparent views in accordance with the disclosed embodiments.
Figure 17B:
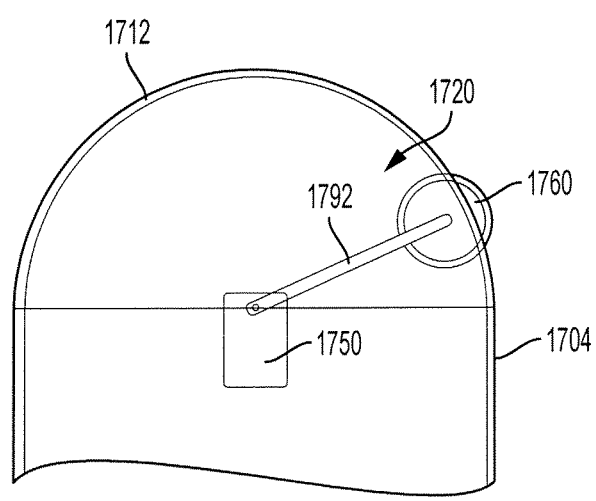

FIG. 17A shows UUV 1700 with cutter system 1720. Cutter system 1720 includes a fixed carriage 1750 positioned inside the hull 1704. Arm 1792 is rotatably connected to carriage 1750 as described above and holds disc shaped cutter 1760. Carriage 1750 is electrically connected to cutter a control system (not shown) as described above. FIG. 17A shows cutter 1760 and cutter arm 1792 in a stowed position with cutter 1760 inside hull 1704. As arm 1792 is rotated, the cutter 1760 passes through slot 1712 and exposes cutter 1760 to the net or other obstruction for cutting. (FIG. 17B) The cutter 1760 may either be stowed on the opposite side of carriage 1750 or returned to its original position.

FIGS. 18A and 18B shows a schematic view of UUV 1800 having a first cutter system 1880 on a forward end of UUV 1800 with first cutter 1882 showing being partially deployed through hull 1804. First cutter 1882 may be any cutter discussed previously included those incorporating tracks and those with fixed carriages. UUV 1800 includes an example cutter system 1820 housed in a pod 1870 (FIG. 18B). Pod 1870 may include any cutter system discussed previously included those incorporating tracks and those with fixed carriages, for example like that discussed with reference to FIGS. 17A and 17B, as shown. Pod 1870 may easily retrofit a cutter system 1820 onto a previously manufactured UUV. Further, the position of the pod may assist in cutting nets or obstruction that may otherwise catch on fin 1806 or other UUV components, for example, antennas, access ports, or arears that would otherwise be missed by first cutter system Although various embodiments of cutter systems were discussed separately, it should be apparent that the disclosed embodiments are not mutually exclusive. As just one non-limiting example, the carriage 350 and cutter 360 discussed with reference to FIGS. 3 and 4 may be used with appropriate modification with the cutter system of FIG. 14 or other cutter systems shown or disclosed. Similarly, other disclosed cutter system features discussed throughout this specification. and as shown throughout all of the embodiments and figures, may be interchanged as would be understood by a person of ordinary skill.

Figure 19:
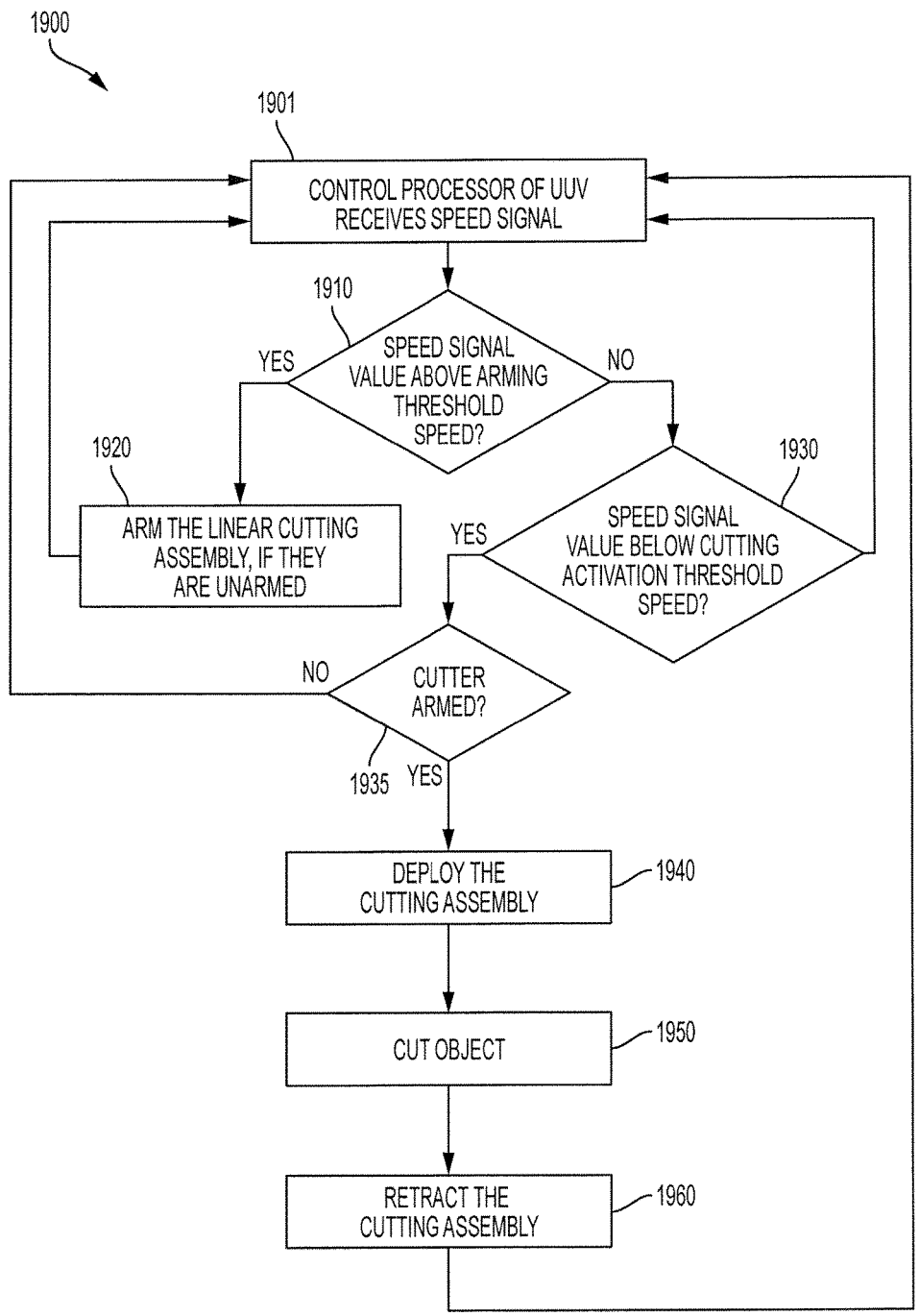
FIG. 19 is a method flowchart in accordance with the disclosed embodiments.

FIG. 19 is a flow chart of a method 1900 for penetrating through a net or object using the any of the above described cutter systems with, for example UUV 100, 200, or any other UUV disclosed in this application. At step 1901, the control processor of UUV 100 receives a speed signal from UUV 100 at predetermined time intervals. It should be appreciated by those skilled in the art that the speed signal can be generated by UUV 100 using any known method of speed detection. Speed sensors such as a pressure switch or a paddle wheel can be used to measure the speed at which UUV 100 is traveling.

According to one embodiment, UUV 100 is configured to travel at 3.0 knots when carrying out a mission. In this embodiment, an arming threshold speed can be set at any speed between 0 and 3 knots, preferably 2.5 knots, for the purpose of determining when to arm the cutting assembly. Upon receiving a speed signal from UUV 100, at step 1910, the control processor determines whether UUV 100 is traveling at a speed above the arming threshold speed. Cutter system remains disarmed until the UUV 100 reaches the arming threshold speed of 2.5 knots. If the speed signal value is above the arming threshold speed, the control processor sends a control signal to arm the cutter system at step 1920, if it is not already aimed. The method returns to step 1901 to wait for the next speed signal from the UUV 100. It should also be appreciated that other methods besides speed detection can be used to determine when to arm the UUV 100. For example, the cutter system can remain disarmed until the UUV 100 reaches a predetermined depth, such as 10 feet underwater. A pressure sensing switch or other devices and methods can be used to detect the depth of the UUV 100. Furthermore, other embodiments can show different speed thresholds as well as travel speeds for the UUV.

A cutting activation threshold speed can be set for the purpose of determining when to deploy the cutter system. It should be appreciated by those skilled in the art that UUV 100 can employ any known method of object detection. The same speed sensor used by UUV 100 to measure its speed can also be used for object detection. For instance, when UUV 100 comes into contact with an obstruction, its speed will decrease. Speed changes can be measured and provided to the control processor at predetermined time intervals such as, for example, every 5 seconds. At step 1930, the control processor determines whether UUV 100 is traveling at a speed below the cutting activation threshold speed of 2.0 knots, for example.

If UUV 100 is traveling at a speed below the cutting activation threshold speed, the control processor determines whether the cutter system is armed at step 1935. The control processor sends a control signal to deploy the cutter at step 1940 if the cutter system is armed. While speed detection is one way of indirectly detecting an object obstructing the path of the UUV 100, it should also be appreciated that other methods and devices such as, for example, a contact switch or a high frequency sonar can be used for object detection.

When actuated, the cutter system emerges from the hull or pod and traverses according to the track or arm path. At the same time, the blade starts oscillating or spinning. A linear cutting blade, for example may have a full cutting speed of preferably about 10 Hz. A disc shaped cutter cutting speed can vary depending on the type of net or object encountered or the diameter of the cutting disc. In one example a 6 inch diameter abrasive cutter may be spun between about 5000 and 8000 RPM.

At step 1950, the cutter system continues to move through its path and penetrates the fishing net or object using the shearing action caused by reciprocating of opposing teeth, the serrations of the blade edge, and or abrasive cutting. The cutter may continue at full cutting speed for a predetermined length of time, preferably 4-8 seconds depending on the type of net encountered. Alternatively, cutter may oscillate or rotate for a predetermined number of revolutions or according to another suitable parameter specified by the control software. In one example, the end of cutter cycle depends on the cutter position in addition to or instead of cutting time or revolutions. The cutter system, in one example, includes one or more position sensors at the end of, or throughout, the cutter's travel range to determine its position. Position sensors may include any position sensors known in the art, for example contact switches and/or magnetic reed switches. The end of a cutter deployment cycle, in one example is determined by the cutter's position at the end of the cutter's travel range, which may be followed by retrieving or retracting. Similarly, when a magnet on a carriage gets to where the magnetic reed switch is located (for example, at the end of the cut) the switch would signal the cutter controller to dock the cutter.

The cutter returns back to its stowed position at step 1960 and the method returns to step 1901 to wait for the next speed signal from the UUV 100. UUV 100 continues with its mission after passing through net.

The length of time that the cutter operating at full cutting speed at step 1950 may not be sufficient for UUV 100 to penetrate the net in one cutting sequence. When the next speed signal at step 1901 indicates that UUV 100 is still traveling below the threshold speed at step 1910 and below the cutting activation threshold speed at step 1930, the cutter will be deployed again at step 1940. The cutter system will repeatedly deploy the cutter until the UUV 100 penetrates through the net and resumes traveling at a speed above the cutting activation threshold speed. Optionally, the control software can set a maximum number of deployments for a given time period.

Disclosed embodiments will simplify and add flexibility to UUV mission planning and execution. UUV operation remains essentially unchanged until an object is detected. Once the object is detected, the cutting system will engage the object, penetrate the object, and allow the UUV to carry out its mission with minimal loss of time. Disclosed embodiments allow a greater percentage of missions to be performed with a reduced risk of UUV loss or damage.

The foregoing merely illustrate the principles of the invention. For example, although the cutters of the illustrative embodiments consist of particular configurations, shapes and materials, it is possible for alternative embodiments to incorporate more than one cutter or type of cutter in a particular system. Similarly, although the UUVs described above have particular shapes, it will be appreciated by those skilled in the art that the UUV can have other shapes. In addition, some portions of system components pictured which may be duplicated with multiple cutters have been omitted from certain figures to aid in particular views.

Although the invention may be used to particular advantage in the context of UUVs, those skilled in the art will be able to incorporate the invention into other underwater vehicles and marine vessels. Those skilled in the art will be able to incorporate the invention into non-marine systems such as, for example, unmanned land vehicles (e.g., cut through vegetation and barbed wires), unmanned robots and other remote vehicles (e.g., space applications). It will thus be appreciated that those skilled in the art will be able to devise numerous alternative arrangements that, while not shown or described herein, embody the principles of the invention and thus are within its spirit and scope.

What is claimed as new and desired to be protected by Letters Patent of the United States is:

1. A cutting system for an underwater vehicle, comprising:
   an underwater vehicle hull;
   a track having a first end and a second end;
   a first carriage configured to move along the track; and
   a first cutter connected to the first carriage, wherein the track, first carriage, and first cutter are configured such that the cutter is at least partially exposed through the hull.

2. The cutting system of claim 1, wherein the track comprises at least two rails.

3. The cutting system of claim 1, wherein the track includes a toothed rack, the first carriage comprises an advancing motor mechanically linked to a toothed gear, and the toothed gear is configured to interlink with the toothed rack such that rotation of the advancing motor moves the first carriage along the track.

4. The cutting system of claim 1, wherein the track comprises a lead screw, the first carriage comprises a lead screw receiver including at least one of a nut and a ball assembly and configured such that rotation of either the lead screw receiver and/or the lead screw moves the first carriage along the track.

5. The cutting system of claim 1, wherein the first carriage comprises at least one roller for rolling along the track.

6. The cutting system of claim 5, wherein the cutting system comprises a first deploying winch mechanically connected to a first deploying cable, the first deploying cable being fastened to the first carriage and configured such that rotation of the first deploying winch in a deploying direction exerts a force on the first deploying cable and moves the first carriage along the track in a direction from the first end towards the second end.

7. The cutting system of claim 6, wherein the cutting system comprises a first retrieving winch mechanically connected to a first retrieving cable, the first retrieving cable being fastened to the first carriage and configured such that rotation of the first retrieving winch in a retrieving direction exerts a force on the first retrieving cable and moves the first carriage along the track in a direction from the second end towards the first end.

8. The cutting system of claim 6, further comprising a spring assembly mechanically connected to a first retrieving cable, the first retrieving cable being mechanically connected to the first carriage and configured such that movement of the first carriage along the track in a direction from the first end towards the second end tensions the spring assembly.

9. The cutting system of claim 6, wherein the first deploying cable comprises at least one of a metal and/or a polymer material.

10. The cutting system of claim 6, wherein the cutting system further comprises at least one pulley configured such that the first deploying cable passes through a portion of the pulley.

11. The cutting system of claim 1, wherein the track comprises a first wall and a second wall, the first and second walls defining a channel, the channel being configured to accept a portion of the first carriage.

12. The cutting system of claim 11, wherein the channel comprises at least one curve.

13. The cutting system of claim 1, wherein the track comprises a first stowage area at the first end of the track such that the first cutter is stowed when the first carriage is in the first stowage area.

14. The cutting system of claim 13, where the track is next to the hull and the track further comprises a first deployed area located further down the track from the stowage area in a direction of the second end of the track from the first end of the track, wherein the first cutter carriage and first cutter are configured to pass the first cutter through a slot in the hull when the first cutter is in the first deployed area, and wherein the first cutter carriage and first cutter are configured to retrieve the first cutter through a slot in the hull when the first cutter is in the first stowage area.

15. The cutting system of claim 1, wherein the carriage comprises a cutter driver motor and the cutter driver motor is mechanically connected to the cutter through a mechanical drive linkage.

16. The cutting system of claim 15, wherein the mechanical drive linkage comprises at least two gears and a drive shaft.

17. The cutting system of claim 15, wherein the mechanical drive linkage comprises at least one drive belt.

18. The cutting system of claim 3, wherein the cutter driver motor and the advancing motor are the same motor.

19. The cutting system of claim 3, wherein the cutter driver motor and the advancing motor are separate motors.

20. The cutting system of claim 15, wherein the cutter is mechanically connected to a fixed arm.

21. The cutting system of claim 15, wherein the cutter is mechanically connected to a rotatable arm.

22. The cutting system of claim 21, wherein the rotatable arm is rotated by a rotation motor.

23. The cutting system of claim 22, wherein the rotation motor and the rotatable arm are connected together though a clutch.

24. The cutting system of claim 1, wherein the cutter is substantially disc shaped.

25. The cutting system of claim 24, wherein the cutter comprises at least one of a hardened straight edge, a hardened serrated edge, and an abrasive edge.

26. The cutting system of claim 25, wherein the abrasive edge comprises at least one of diamond and/or tungsten carbide.

27. The cutting system of claim 1, wherein the cutter comprises at least two blades configured to provide a cutting action when moved relative to each other.

28. The cutting system of claim 1, wherein the cutter is configured to rotate relative to and in-line with the track.

29. The cutting system of claim 1, wherein the cutting system further comprises a second carriage configured to move along the track and a second cutter connected to the second carriage.

30. The cutting system of claim 6, wherein the cutting system comprises a second deploying winch mechanically connected to a second deploying cable, the second deploying cable being fastened to a second carriage and configured such that rotation of the second deploying winch in a deploying direction exerts a force on the second deploying cable and moves the second carriage along the track in a direction from the second end towards the first end.

31. The cutting system of claim 30, wherein the cutting system comprises a second retrieving winch mechanically connected to a second retrieving cable, the second retrieving cable being fastened to the second carriage and configured such that rotation of the second retrieving winch in a retrieving direction exerts a force on the second retrieving cable and moves the second carriage along the track in a direction from the second end towards the first end.

32. The cutting system of claim 1, wherein the track, first carriage, and first cutter are configured such that the cutter is fully exposed through the hull.

33. The cutting system of claim 1, wherein the track, first carriage, and first cutter are configured such that the cutter is at least partially exposed through the hull while cutting.

34. A cutting system for an underwater vehicle, comprising:
a track having a first end and a second end;
a first carriage configured to move along the track;
a hull next to the track; and
a first cutter connected to the first carriage,
wherein the track comprises a first stowage area at the first end of the track such that the first cutter is stowed when the first carriage is in the first stowage area and the track further comprises a first deployed area located further down the track from the stowage area in a direction of the second end of the track from the first end of the track, wherein the first cutter carriage and first cutter are configured to pass the first cutter through a slot in the hull when the first cutter is in the first deployed area, and wherein the first cutter carriage and first cutter are configured to retrieve the first cutter through a slot in the hull when the first cutter is in the first stowage area.

35. The cutting system of claim 34, wherein the track comprises at least two rails.

36. The cutting system of claim 34, wherein the track includes a toothed rack, the first carriage comprises an advancing motor mechanically linked to a toothed gear, and the toothed gear is configured to interlink with the toothed rack such that rotation of the advancing motor moves the first carriage along the track.

37. The cutting system of claim 34, wherein the track comprises a lead screw, the first carriage comprises a lead screw receiver including at least one of a nut and a ball assembly and configured such that rotation of either the lead screw receiver and/or the lead screw moves the first carriage along the track.

38. The cutting system of claim 34, wherein the first carriage comprises at least one roller for rolling along the track.

39. The cutting system of claim 38, wherein the cutting system comprises a first deploying winch mechanically connected to a first deploying cable, the first deploying cable being fastened to the first carriage and configured such that rotation of the first deploying winch in a deploying direction exerts a force on the first deploying cable and moves the first carriage along the track in a direction from the first end towards the second end.

40. The cutting system of claim 39, wherein the cutting system comprises a first retrieving winch mechanically connected to a first retrieving cable, the first retrieving cable being fastened to the first carriage and configured such that rotation of the first retrieving winch in a retrieving direction exerts a force on the first retrieving cable and moves the first carriage along the track in a direction from the second end towards the first end.

41. The cutting system of claim 39, further comprising a spring assembly mechanically connected to a first retrieving cable, the first retrieving cable being mechanically connected to the first carriage and configured such that movement of the first carriage along the track in a direction from the first end towards the second end tensions the spring assembly.

42. The cutting system of claim 39, wherein the first deploying cable comprises at least one of a metal and/or a polymer material.

43. The cutting system of claim 39, wherein the cutting system further comprises at least one pulley configured such that the first deploying cable passes through a portion of the pulley.

44. The cutting system of claim 34, wherein the track comprises a first wall and a second wall, the first and second walls defining a channel, the channel being configured to accept a portion of the first carriage.

45. The cutting system of claim 44, wherein the channel comprises at least one curve.

46. The cutting system of claim 34, wherein the carriage comprises a cutter driver motor and the cutter driver motor is mechanically connected to the cutter through a mechanical drive linkage.

47. The cutting system of claim 46, wherein the mechanical drive linkage comprises at least two gears and a drive shaft.

48. The cutting system of claim 46, wherein the mechanical drive linkage comprises at least one drive belt.

49. The cutting system of claim 36, wherein the cutter driver motor and the advancing motor are the same motor.

50. The cutting system of claim 36, wherein the cutter driver motor and the advancing motor are separate motors.

51. The cutting system of claim 46, wherein the cutter is mechanically connected to a fixed arm.

52. The cutting system of claim 46, wherein the cutter is mechanically connected to a rotatable arm.

53. The cutting system of claim 52, wherein the rotatable arm is rotated by a rotation motor.

54. The cutting system of claim 53, wherein the rotation motor and the rotatable arm are connected together though a clutch.

55. The cutting system of claim 34, wherein the cutter is substantially disc shaped.

56. The cutting system of claim 55, wherein the cutter comprises at least one of a hardened straight edge, a hardened serrated edge, and an abrasive edge.

57. The cutting system of claim 56, wherein the abrasive edge comprises at least one of diamond and/or tungsten carbide.

58. The cutting system of claim 34, wherein the cutter comprises at least two blades configured to provide a cutting action when moved relative to each other.

59. The cutting system of claim 34, wherein the cutter is configured to rotate relative to and in-line with the track.

60. The cutting system of claim 34, wherein the cutting system further comprises a second carriage configured to move along the track and a second cutter connected to the second carriage.

61. The cutting system of claim 39, wherein the cutting system comprises a second deploying winch mechanically connected to a second deploying cable, the second deploying cable being fastened to a second carriage and configured such that rotation of the second deploying winch in a deploying direction exerts a force on the second deploying cable and moves the second carriage along the track in a direction from the second end towards the first end.

62. The cutting system of claim 61, wherein the cutting system comprises a second retrieving winch mechanically connected to a second retrieving cable, the second retrieving cable being fastened to the second carriage and configured such that rotation of the second retrieving winch in a retrieving direction exerts a force on the second retrieving cable and moves the second carriage along the track in a direction from the second end towards the first end.

63. A cutting system for an underwater vehicle, comprising:

a track having a first end and a second end:

a first carriage configured to move along the track, wherein the first carriage comprises at least one roller for rolling along the track; and a first cutter connected to the first carriage, wherein the cutting system comprises a first deploying winch mechanically connected to a first deploying cable, the first deploying cable being fastened to the first carriage and configured such that rotation of the first deploying winch in a deploying direction exerts a force on the first deploying cable and moves the first carriage along the track in a direction from the first end towards the second end, and the cutting system further comprises a spring assembly mechanically connected to a first retrieving cable, the first retrieving cable being mechanically connected to the first carriage and configured such that movement of the first carriage along the track in a direction from the first end towards the second end tensions the spring assembly.

* * * * *